(12) United States Patent
Hatsuzawa et al.

(10) Patent No.: US 7,845,616 B2
(45) Date of Patent: Dec. 7, 2010

(54) INDUCTIVE ROTATION ANGLE SENSOR AND MOTOR-DRIVEN AIRFLOW CONTROL DEVICE USING THE SAME

(75) Inventors: Hidefumi Hatsuzawa, Mito (JP); Takahiro Shimura, Mito (JP); Masahiko Soshino, Hitachiohta (JP)

(73) Assignee: Hitachi, Ltd., Tokyo (JP)

( * ) Notice: Subject to any disclaimer, the term of this patent is extended or adjusted under 35 U.S.C. 154(b) by 557 days.

(21) Appl. No.: 11/869,293

(22) Filed: Oct. 9, 2007

(65) Prior Publication Data
US 2008/0087858 A1 Apr. 17, 2008

(30) Foreign Application Priority Data
Oct. 11, 2006 (JP) .............................. 2006-277101

(51) Int. Cl.
*F16K 31/12* (2006.01)

(52) U.S. Cl. .............. 251/129.11; 137/554; 324/207.25

(58) Field of Classification Search ............ 251/129.11, 251/129.12; 137/553, 554; 324/207.11, 324/207.25
See application file for complete search history.

(56) References Cited

U.S. PATENT DOCUMENTS

| | | | | |
|---|---|---|---|---|
| 4,392,375 A | * | 7/1983 | Eguchi et al. ............ | 73/114.36 |
| 5,730,861 A | * | 3/1998 | Sterghos et al. ............... | 210/86 |
| 6,018,241 A | * | 1/2000 | White et al. ............. | 324/207.2 |
| 6,518,750 B1 | * | 2/2003 | Lin et al. ................. | 324/207.2 |
| 6,886,800 B2 | | 5/2005 | Fauni | |

FOREIGN PATENT DOCUMENTS

JP  2003-254782 A  9/2003

* cited by examiner

*Primary Examiner*—John K Fristoe, Jr.
(74) *Attorney, Agent, or Firm*—Crowell & Moring LLP

(57) ABSTRACT

A motor-driven airflow control device is provided wherein an inductance-based non-contact rotation angle sensor is compactly formed at an end of a throttle shaft. An exciting conductor is attached at an end of a rotating shaft to which a throttle valve is attached, a window hole is provided on a gear cover, a stationary substrate with energizing and signal-generating conductors formed thereon is attached to the gear cover so as to face the exciting conductor on the rotating shaft side through the window hole, and the window hole of the gear cover is covered by a thin shield member. The energizing and signal-generating conductors can be shielded from a space where the exciting conductor of the rotary member is arranged, making it possible to obtain a highly reliable motor-driven airflow control device including an inductance-based non-contact rotation angle sensor which is not affected by environments on the rotary member side.

20 Claims, 16 Drawing Sheets

INDUCTIVE ROTATION ANGLE SENSOR AND MOTOR-DRIVEN AIRFLOW CONTROL DEVICE USING THE SAME

BACKGROUND OF THE INVENTION

1. Field of the Invention

The present invention relates to a rotation angle sensor which detects a rotational position of a rotating conductor. The invention is based on the principle that the inductance between a conductor attached to a rotating shaft of a rotary member and a coil conductor attached to a stator facing the former conductor changes according to positional relation between both conductors.

Further, the present invention relates to a motor-driven airflow control device which electrically controls an area of opening of an air intake passage of an internal combustion engine by use of a motor-driven throttle valve, the apparatus including the above-mentioned rotation angle sensor in order to detect a rotational angle of the throttle valve.

2. Description of the Related Art

Examples of a so-called non-contact rotation angle sensor, which detects a position or rotational angle of a rotary member through inductance variation, include an apparatus disclosed in JP-A-2003-254782.

This rotation angle sensor includes a magnetic disc and a conductor disc. The magnetic disc and conductor disc each have a slit in a radial direction and intersect with each other at the slits, one of the discs being fixed and the other attached to a rotating shaft, wherein an exposure area of the magnetic disc and the conductor disc viewed from one side of the shaft direction is changed with the rotation to vary the inductance of a coil disposed in proximity thereto, thereby detecting an angular position of the rotating shaft through inductance variation.

Further, the use of this kind of rotation angle sensor as a rotation angle sensor for a motor-driven throttle valve is proposed U.S. Pat. No. 6,886,800.

SUMMARY OF THE INVENTION

With a conventional non-contact rotation angle sensor of this kind, it is necessary to provide a magnetic disc and a conductor disc between two detection coils provided on a stator, one of discs being attached to a rotary member and the other to the stator. This configuration causes a problem that the apparatus becomes large in size.

Further, if the latter conventional technology is adopted for a motor-driven airflow control device, a substrate with electronic components mounted thereon is exposed to moisture and chemicals from an air intake passage, or resin powder and metal powder which are abrasion powder from gears and bearings, which may cause oxidization, corrosion, or electromagnetic degradation. Therefore, it is necessary to take into consideration a problem that the reliability is degraded by such factors.

Further, if the clearance between a rotating conductor and a substrate having the coils on the stationary (detection) side increases, the electromagnetic induction decreases which may cause degradation of the position detection accuracy.

An object of the present invention is to obtain a compact inductance-based rotation angle sensor.

Further, a second object is to ensure a sufficient reliability and detection accuracy even if the rotation angle sensor is mounted on a motor-driven airflow control device.

To accomplish the first object, the present invention comprises: an exciting conductor attached to a rotating shaft of a rotary member; energizing conductors which are attached to a stationary substrate provided in proximity to the rotary member, to excite a current in the exciting conductor in electromagnetic cooperation with the exciting conductor; and signal-generating conductors which are attached to the stationary substrate together with the energizing conductors, in which alternating-current signals are induced by the current generated in the exciting conductor; and is configured so as to detect a rotational position of the exciting conductor from the variation of the alternating-current signal that changes with inductance variation caused by the rotation of the exciting conductor.

Preferably, a window hole is made on a case to which the stationary substrate is fixed, the stationary substrate is fixed to the case so that the energizing and signal-generating conductors face the exciting conductor of the rotary member through this window hole, and the window hole of the case is covered by a thin shield member to shield the energizing and signal-generating conductors from the space where the exciting conductor of the rotary member is arranged.

Further, in order to accomplish the second object, an exciting conductor is attached at an end of the rotating shaft to which a throttle valve is attached; a gear cover is attached to the throttle valve control apparatus so as to cover a gear mechanism that transmits motor torque to the rotating shaft; this gear cover is provided with the energizing conductors provided in proximity to the exciting conductor to excite a current in the exciting conductor in electromagnetic cooperation with the exciting conductor, and the signal-generating conductors in which alternating-current signals are induced by a current generated in the exciting conductor; and a rotational position of the rotating shaft to which the above-mentioned exciting conductor is attached is detected from the variation of the alternating-current signal that changes with inductance variation caused by the rotation of the exciting conductor, thus detecting a rotational angle of the throttle valve.

Preferably, a window hole is made on the gear cover, the stationary substrate with energizing and signal-generating conductors formed thereon is attached to the gear cover so as to face the exciting conductor on the rotating shaft side through this window hole, and the window hole of the gear cover is covered by a thin shield member to shield the energizing and signal-generating conductors from the space where the exciting conductor of the rotary member is arranged.

In accordance with the present invention, an inductance-based non-contact rotation angle sensor can compactly be formed at an end of the rotating shaft of the rotary member, making it possible to provide a compact rotation angle sensor or a motor-driven airflow control device including the same.

In accordance with a suitable configuration, a signal-detecting element can be insulated from a chamber of the rotary member, making it possible to provide a highly reliable rotation angle sensor which is not affected by environmental conditions on the rotary member side or a motor-driven airflow control device including the same.

DETAILED DESCRIPTION OF THE PREFERRED EMBODIMENTS

Embodiments according to the present invention will be explained below with reference to the accompanying drawings.

First Embodiment

An embodiment of a rotation angle sensor according to the present invention will be explained with reference to FIGS. 1 and 2.

Figure 1:
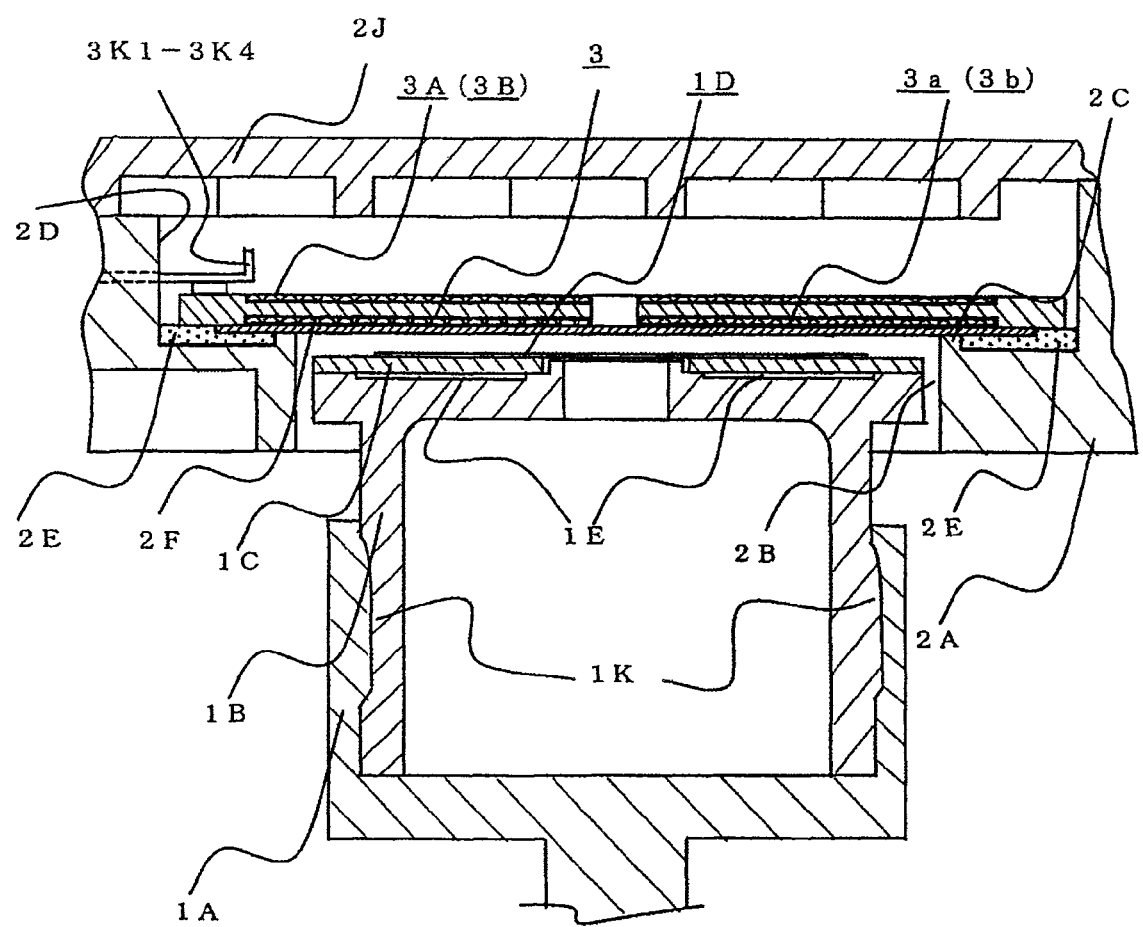
FIG. 1 is an enlarged sectional view of essential parts of an inductance-based non-contact rotation angle sensor.

As shown in FIG. 1, a bottomed cylindrical holder 1B made of resin-molded material is attached at the end of a rotating shaft 1A. A disc 1C made of an insulating material is fixed to the end face of the holder 1B through adhesion. An annular depression 1E is formed on the end face of the holder 1B, adhesive agent is poured into this depression 1E, and the disc 1C is mounted on the depression to be bonded. A later-mentioned exciting conductor 1D is printed on the surface (surface on the opposite side of the adhesion surface) of the disc 1C.

Grooves axially extending and elongated protrusions axially extending are alternately formed on the outer circumferential surface of the cylindrical portion of the holder 1B. Corrugated portions are formed on the inner circumferential surface of a rotary member 1A so as to fit the grooves and elongated protrusions of the holder 1B at fitting portions 1K. The rotary member 1A and the holder 1B may be bonded on fitting surfaces using adhesive agent. In this way, the fitting portions 1K serve to retain and position the holder 1B.

The exciting conductor 1D is composed of a set of three straight portions 1D1 radially extending outward and arc-shaped portions 1D2 and 1D3 arranged so as to respectively connect the inner and outer circumference sides of the neighboring sets of straight portions 1D1. A total of six sets of straight portions 1D1 are arranged at intervals of 60 degrees.

A round-shaped window hole 2B having a diameter slightly larger than that of the holder 1B is provided in a case 2A of a sensor. A small annular projection 2C is formed at the periphery of the window hole 2B. In the case 2A, a wall 2D which forms a space for storing the detecting element is formed at the periphery of the window hole 2B through resin molding.

Figure 3:
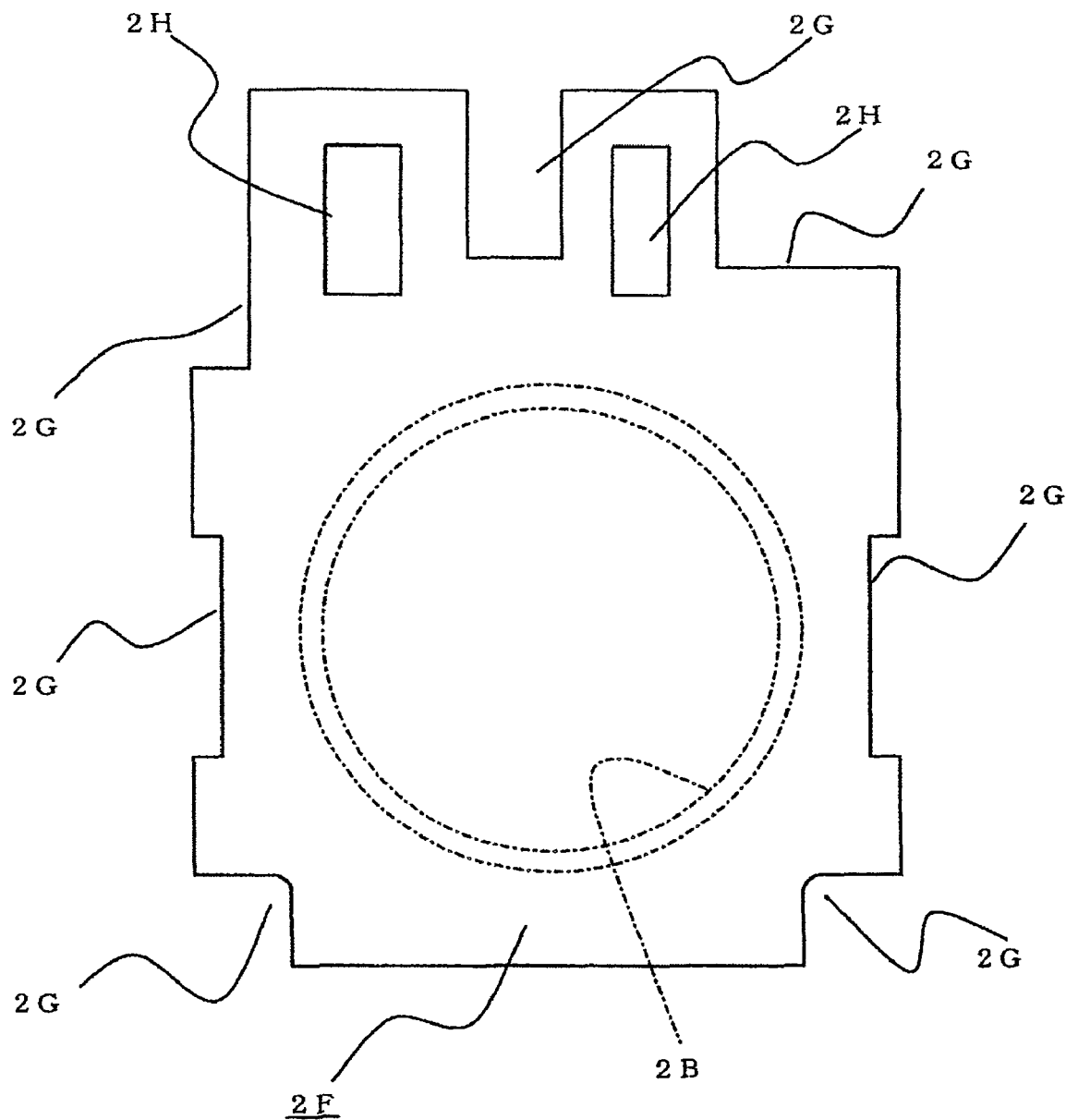
FIG. 3 is an enlarged plan view of main parts of an inductance-based non-contact rotation angle sensor.

Adhesive agent 2E is poured into a concaved portion formed by the annular projection 2C and the wall 2D. A resin film 2G as shown in FIG. 3 is installed on this adhesive agent 2E so as to block the annular window hole 2B. Some cutouts 2G are arranged at the periphery of the resin film 2G, at which adhesive agent is exposed.

On this resin film 2F, a later-mentioned stationary substrate 3 with energizing conductors 3A and 3a and signal-detecting conductors 3B and 3b printed thereon is installed. The periphery of the stationary substrate is fixed to the bottom of the case 2A, together with the resin film 2F, by the adhesive agent 2E exposed at the periphery of the resin film 2F.

Two square window holes 2H provided on the film 2F are used to extract air bubbles accumulated between the adhesive agent 2E and the resin film 2F and between the resin film 2F and the stationary substrate 3. The resin film 2F has an area that covers at least the energizing conductors 3a and the signal-detecting conductors 3b that are printed on the reverse side of the stationary substrate. Further, distances between the stationary substrate 3 and the resin film 2F are defined so that adhesive agent does not flow into the energizing conductors 3a and the signal-detecting conductors 3b from between the stationary substrate 3 and the resin film 2F. Further, it may be possible that a groove be provided on the stationary substrate 3 so as to surround the energizing conductors 3a and that this groove be covered by the resin film 2F. Even if adhesive agent advances from between the stationary substrate 3 and the resin film 2F, this configuration prevents the adhesive agent from reaching the energizing conductors 3a.

The storage space of the case 2A is covered by a cover plate 2J which is bonded to the case 2 by adhesive agent to shield the storage space from ambient air.

Terminals 3K1 to 3K4 molded to the case 2A are electrically connected to the stationary substrate 3.

Figure 2:
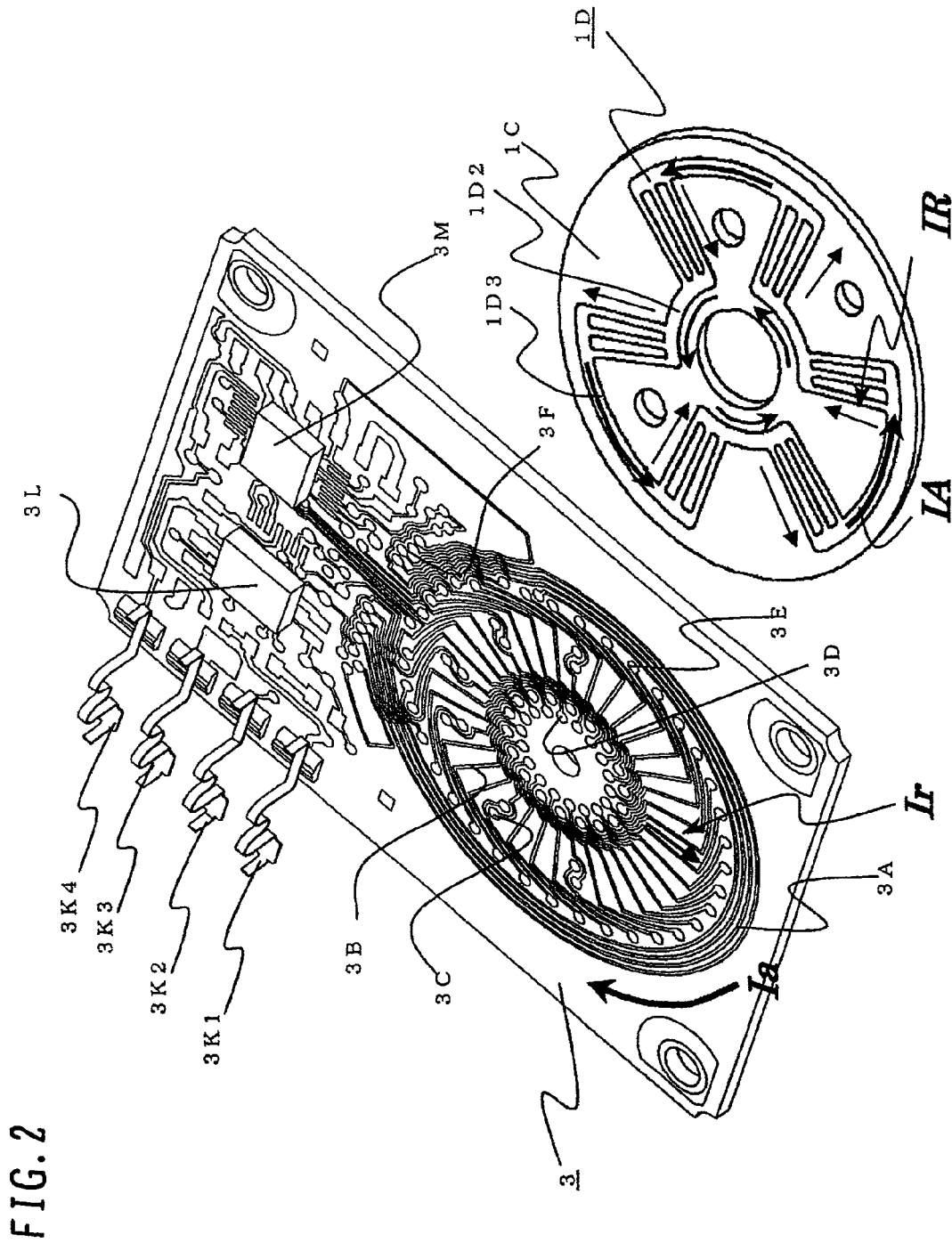
FIG. 2 is a fragmentary perspective view of essential parts of an inductance-based non-contact rotation angle sensor.

Four annular energizing conductors 3A are printed on the stationary substrate 3 which is an insulating substrate, as shown in FIG. 2. Further, a plurality of signal-detecting conductors 3B radially extending outward are printed on the inner side of the energizing conductors. Energizing conductors 3A and signal-detecting conductors 3B that are similar to the above-mentioned conductors are printed also on the reverse side of the stationary substrate 3, and the energizing conductors 3A and signal-detecting conductors 3B on the obverse and reverse sides are connected through holes 3C to 3F.

The present embodiment is configured so as to obtain three phases of alternating-current signals each having a phase shifted by 120 degrees from each other from the signal-detecting conductors 3B.

Further, by forming two sets of the same non-contact rotation detection apparatuses and comparing mutual signals, the present invention is configured so as to detect abnormal condition of the sensor and mutually back up under abnormal condition.

Microcomputers 3L and 3M are provided with drive control and signal processing functions for respective non-contact rotation angle sensors.

Of terminals 3K1 to 3K4, one is a power supply terminal (for example, 3K1), another one is a ground terminal (for example, 3K3), and remaining two, 23K2 and 3K4, function as a signal output terminal for respective angle detection apparatus. By thus arranging the ground terminal between the signal terminals, it becomes possible to prevent both signals from becoming abnormal at the same time with the signal terminals functioning as short.

Microcomputers 3L and 3M supply a current from the power supply terminal 3K1 to the energizing conductors 3A, process three phases of alternating-current waveforms generated in the signal-detecting conductors 3B, and detect the rotational position of the disc 1C with the exciting conductor 1D attached thereto, thereby detecting the rotational angle of the rotating shaft 1A.

Operations of a non-contact inductance-based rotation angle sensor according to the present embodiment will be explained below.

It may be assumed that the microcomputer 3M basically controls conductor pattern groups 3A and 3B which constitute a first rotation angle sensor formed on the obverse and reverse sides of the stationary substrate of FIG. 1.

On the other hand, it may be assumed that the microcomputer 3L controls conductor pattern groups 3A and 3B which constitute a second rotation angle sensor formed on the obverse and reverse sides of the stationary substrate of FIG. 1. Each of the computers 3L and 3M supplies a direct current Ia from the power supply terminal 3K1 to the energizing conductors 3A.

When the direct current Ia flows, a current IA having the opposite direction of the current Ia is excited in an outer-circumferential arc-shaped conductor 1D3 of the exciting conductor 1D on the disc 1C, which faces the energizing conductors 3A. This excited current IA flows in the directions indicated by arrows over the entire exciting conductor ID. A current IR flowing to the radiating conductor 1D1 induces a current Ir having the opposite direction of the current IR in the radiating conductors of the signal-detecting conductors 3B which faces the radiating conductor 1D1. This current Ir is an alternating current.

The 36 signal-detecting conductors 3B radially extending outward at equal intervals on the obverse side form three phase (phases U, V, and W) patterns for the first rotation angle sensor. The 36 signal-detecting conductors 3B radially extending outward at equal intervals on the reverse side form three phase (phases U, V, and W) patterns for the second rotation angle sensor.

The alternating current Ir has a phase shifted by 120 degrees in each of the phases U, V, and W when the disc 1C is at a specific rotational position, for example, a start position (with a rotational angle of zero).

As the disc rotates, these three phases of alternating currents shift mutually. The microcomputers 3L and 3M detect this phase difference and accordingly determine how much the disc 1C has rotated based on the phase difference.

Two signal currents of the first and second rotation angle sensor signals, inputted from the signal-detecting conductors 3B to the microcomputers 3L and 3M, basically indicate the same value. The microcomputers 3L and 3M process the same signal currents and then output signal voltages having the same variation with opposite inclination from the signal terminals 3K1 to 3K4. These signals are proportional to the rotational angle of the disc. An external apparatus which receives and monitors both signals, and judges whether the first and second rotation angle sensors are normal. If either one detection apparatus indicates an abnormal condition, the signal of the other detection apparatus is used as a control signal.

An example of the above-mentioned non-contact rotation angle sensor applied to a motor-driven airflow control device for diesel engines will be explained below, with reference to FIGS. 4 to 9.

Figure 4:
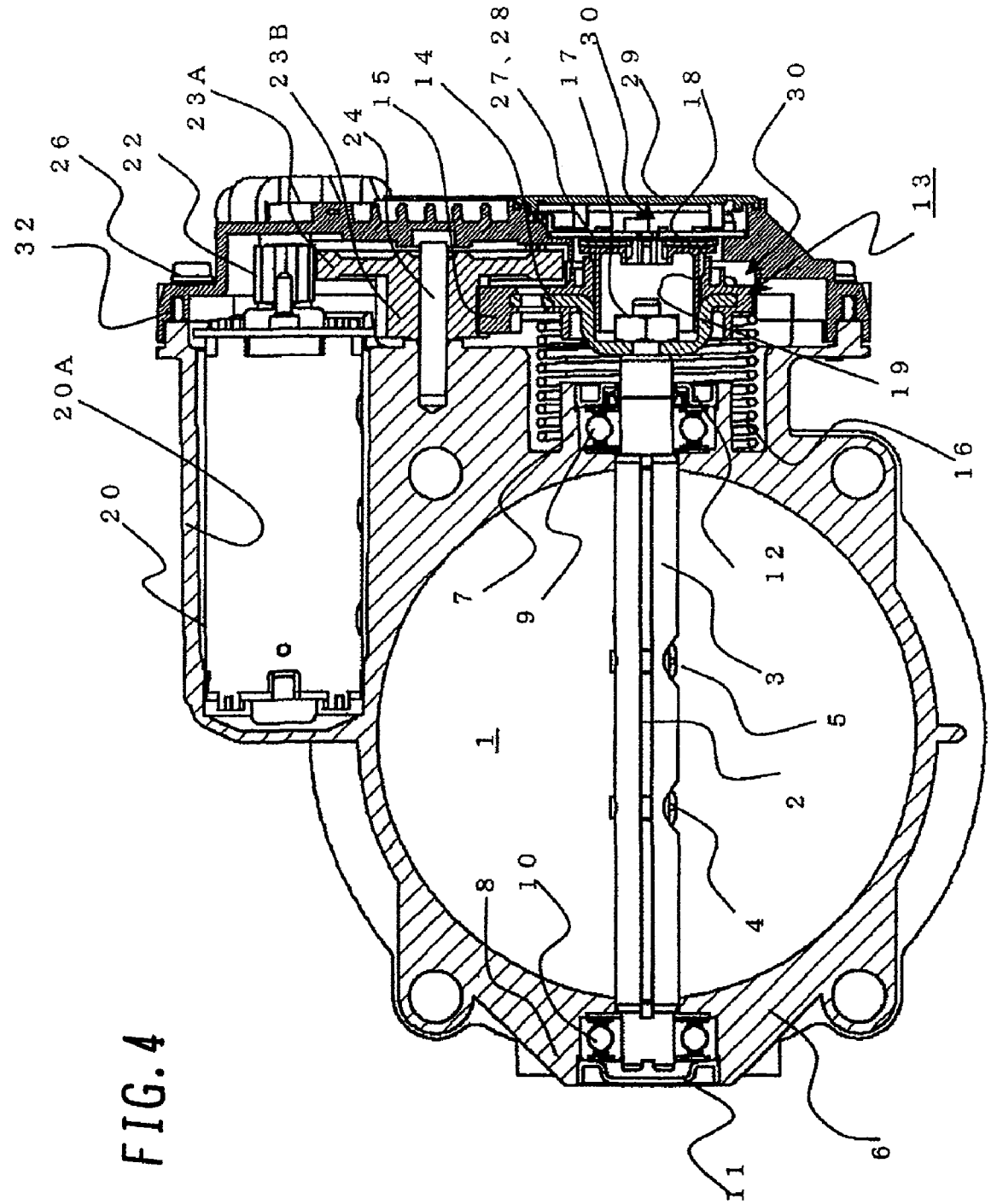
FIG. 4 is a sectional view of a motor-driven airflow control device used for diesel engine vehicles.

FIG. 4 is a sectional view of essential parts. FIGS. 5 to 9 are fragmentary perspective views for explaining detailed structure.

The configuration of the motor-driven airflow control device will be explained below.

An air intake passage 1 (hereinafter referred to as bore) and a motor housing 20A for storing a motor 20 are molded together in a throttle valve assembly 6 (hereinafter referred to as throttle body) made by aluminum die-casting.

In a throttle body 6, a rotating metal shaft (hereinafter referred to as throttle shaft) 3 is arranged along a diameter line of a bore 1. Both ends of the throttle shaft 3 are fitted and fixed to inner rings of ball bearings 9 and 10. Outer rings of the ball bearings 9 and 10 are press-fitted to bearing bosses 7 and 8 provided in the throttle body 6.

In this way, the throttle shaft 3 is rotatively supported with respect to the throttle body 6. The throttle valve 2 made of a metal disc is fixed to the throttle shaft 3 with screws 4 and 5 which are inserted into slits provided in the throttle shaft 3.

In this way, as the throttle shaft 3 rotates and accordingly the throttle valve 2 rotates, the cross-sectional area of the air intake passage varies allowing control of the intake air flow rate to the engine.

The motor housing 20A is formed in substantially parallel with the throttle shaft 3. The motor 20, i.e., a brush-type direct-current motors, is inserted into the motor housing 20A and fixed to a side wall 6A of the throttle body 6 by bolting the flanges of a motor bracket 20B of the motor 20 using screws 21.

An opening of the bearing boss 8 is sealed by a cap 11. On the side of the bearing boss 9, a seal ring 12 is arranged between the throttle shaft 3 and an inner wall of the bearing boss 9 to form a shaft sealed portion in order to maintain hermetic sealing.

This prevents leak of air and grease for bearing lubrication from the bearings to ambient air or a later-mentioned sensor room.

A metal gear 22 with the least number of teeth is fixed to an end of the rotating shaft of the motor 20. A reduction gear mechanism and a spring mechanism for rotatively driving the throttle shaft 3 are collectively arranged on a side wall of the throttle body on which this gear 22 is provided. These mechanisms are covered by a cover (hereinafter referred to as gear cover) made of a resin material, which is fixed to the side wall of the throttle body 6. The inductance-based non-contact rotation angle sensor (hereinafter referred to as throttle sensor) explained in FIGS. 1 to 3 is installed in a so-called gear housing 30 covered by this gear cover, and the rotational angle of the throttle shaft 3, i.e., the opening of the throttle valve 2 is detected thereby.

For a motor-driven airflow control device to which the above-mentioned rotation angle sensor is applied, the signal-detecting conductors and the energizing conductors of the throttle sensor can be protected from nitrogen that leaks from the shaft seal 12 to the gear housing 30, moisture, and other chemicals, and from adhesion of grease, abrasion powder of gears, etc.

A throttle gear 13 is fixed to the end of the throttle shaft 3 on the side of the gear housing 30. The throttle gear 13 is composed of a metal plate 14 and a gear 15 made of a resin material which is resin-molded thereon. The central part of the metal plate 14 is provided with a cup-shaped concaved portion, and the end on the opening side of the concaved portion has a flange for gear molding. The gear 15 made of a resin material is molded to this flange through resin molding.

The metal plate 14 has a hole at the center of the concaved portion. An end of the throttle shaft 3 is threaded. The end of the throttle shaft 3 is inserted into the hole of the concaved portion of the metal plate 14 and then a nut 17 is screwed on the threaded portion of the throttle shaft to fix the metal plate 14 to the throttle shaft 3. In this way, the metal plate 14 and the gear 15 made of a resin material molded thereon rotate integrally with the throttle shaft 3.

A return spring 16 formed by a coil spring is sandwiched between the reverse side of the throttle gear 13 and the side wall of the throttle body 6 in axially compressed fashion. As a result, a rightward preload is constantly applied to the throttle shaft 3, suppressing shakiness axially caused by the gap of the ball bearings.

One side of the return spring 16 surrounds the bearing boss 7, and an end of the return spring is stopped by a notch formed on the throttle body 6 such that the return spring is prevented from rotating in the rotational direction. The other side of the return spring surrounds the cup-shaped portion of the metal plate 14, and an end of the return spring is stopped by a hole formed on the metal plate 14 such that the return spring is prevented from rotating in the rotational direction.

Since the present embodiment is associated with a throttle valve control apparatus for diesel engines, the initial position of the throttle valve 2, i.e., an opening position given to the throttle valve 2 as an initial position when the motor 20 is turned off is the fully open position.

Therefore, a preload in the rotational direction is applied to the return spring 16 so that the throttle valve 2 maintains the fully open position when the motor 20 is turned off.

An intermediate gear 23, rotatively supported by a metal shaft 24 press-fitted to the side wall of the throttle body 6, is engaged between the gear 22 attached to the rotating shaft of the motor 20 and the gear 25 fixed to the throttle shaft 3. The intermediate gear 23 is composed of a large-diameter gear 23A engaged with the gear 22 and a small-diameter gear 23B engaged with the throttle gear 13. Both gears are integrally molded through resin molding. These gears 22, 23A, 23B, and 15 constitute a two-stage reduction gear mechanism.

In this way, the rotation of the motor 20 is transmitted to the throttle shaft 3 through this reduction gear mechanism.

These reducer and spring mechanism are covered by a gear cover 25 made of a resin material. A groove for inserting a seal member 32 is formed at the open circumferential edge of the gear cover 25. If the gear cover 25 is put on the throttle body 6 with the seal member 32 attached to this groove, the seal member 32 is attached to an end face of a frame surrounding the gear housing 30 formed on the side wall of the throttle body 6 to shield the inside of the gear housing 30 from ambient air. Under this condition, the gear cover 25 is fixed to the throttle body 6 using six screws 26.

Thus, a rotation angle sensor provided between the thus configured reduction gear mechanism and the gear cover that covers it, i.e., a throttle sensor, will specifically be explained below.

The outer circumferential surface of the cylindrical portion of a resin holder 19 is fixed to the inner circumferential surface of the cup-shaped portion of the throttle gear 13 through the above-mentioned corrugated fitting portions. A disc 18A with a conductor plate 18 printed thereon is attached through adhesion to the planar portion at an end of the resin holder 19.

Therefore, when the motor 20 rotates and accordingly the throttle valve 2 rotates, the conductor plate 18 also rotates together.

A stationary substrate 27 included in the throttle sensor is fixed to the gear cover 25 at a position facing the conductor plate 18 with a film (hereinafter referred to as thin resin plate) 28 sandwiched therebetween.

If the stationary substrate with sensor electronic components mounted thereon is installed in this gear housing 30, the substrate will be exposed to abrasion powder of gears and other mechanical parts as well as condensation by expansion and compression of air in the gear housing 30.

Further, when taking into consideration the installation of an electronic throttle body on a diesel engine, $SO_2$ (sulfur dioxide), $S_8$ (sulfur), and other sulfur-group chemicals flow into the gear housing 30 from the bore 1 through the bearing 9 and the seal ring 12, which may cause corrosion of the conductors on the stationary substrate 27 by sulfide.

Figure 5:
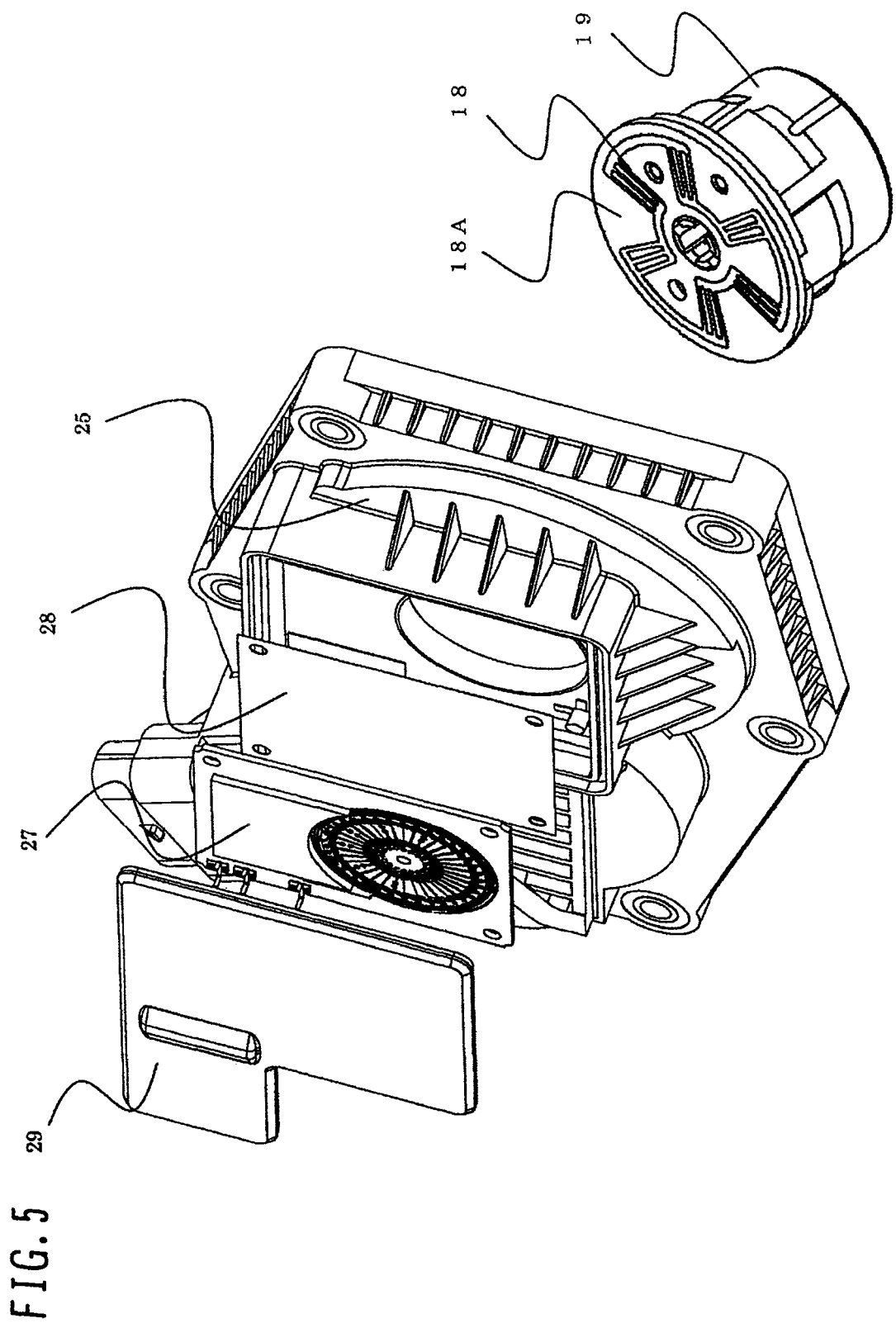
FIG. 5 is a fragmentary perspective view of a gear cover of a motor-driven airflow control device used for diesel engine vehicles.
Figure 6:
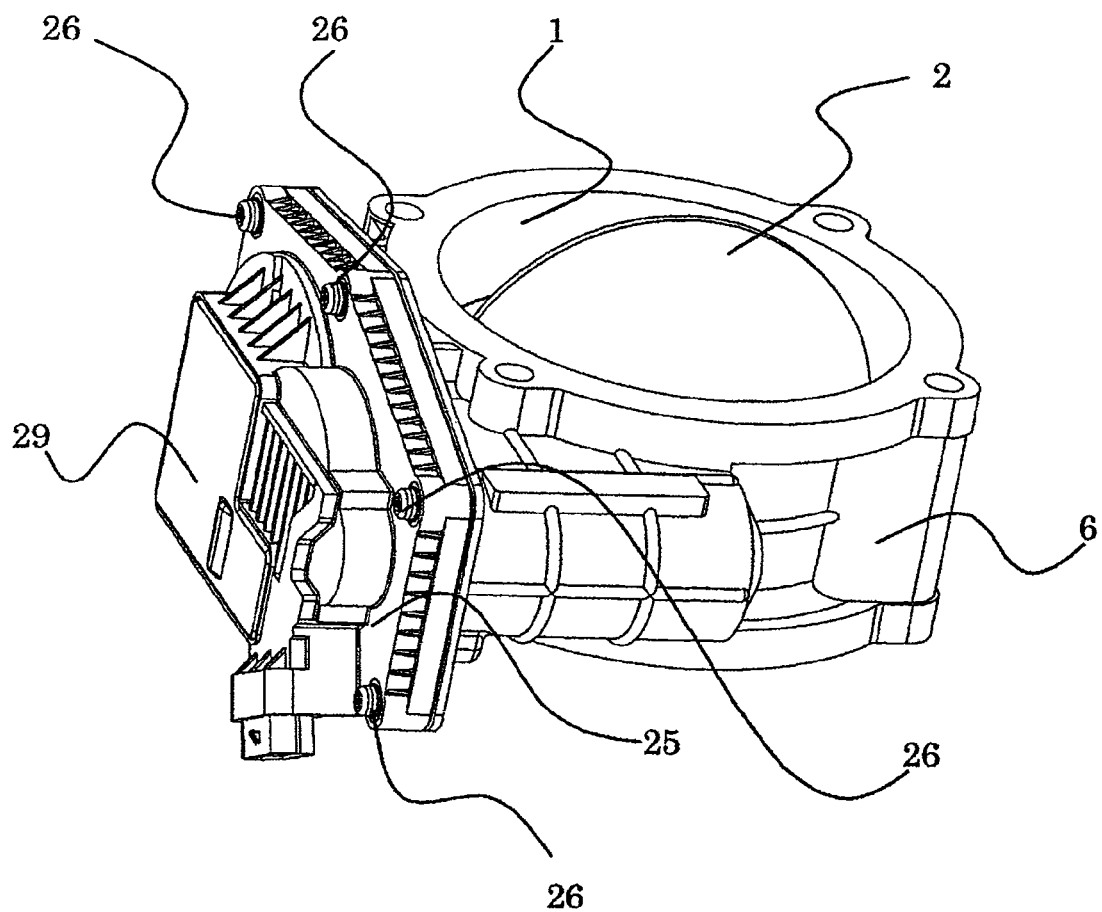
FIG. 6 is an appearance perspective view of a motor-driven airflow control device used for diesel engine vehicles.
Figure 7:
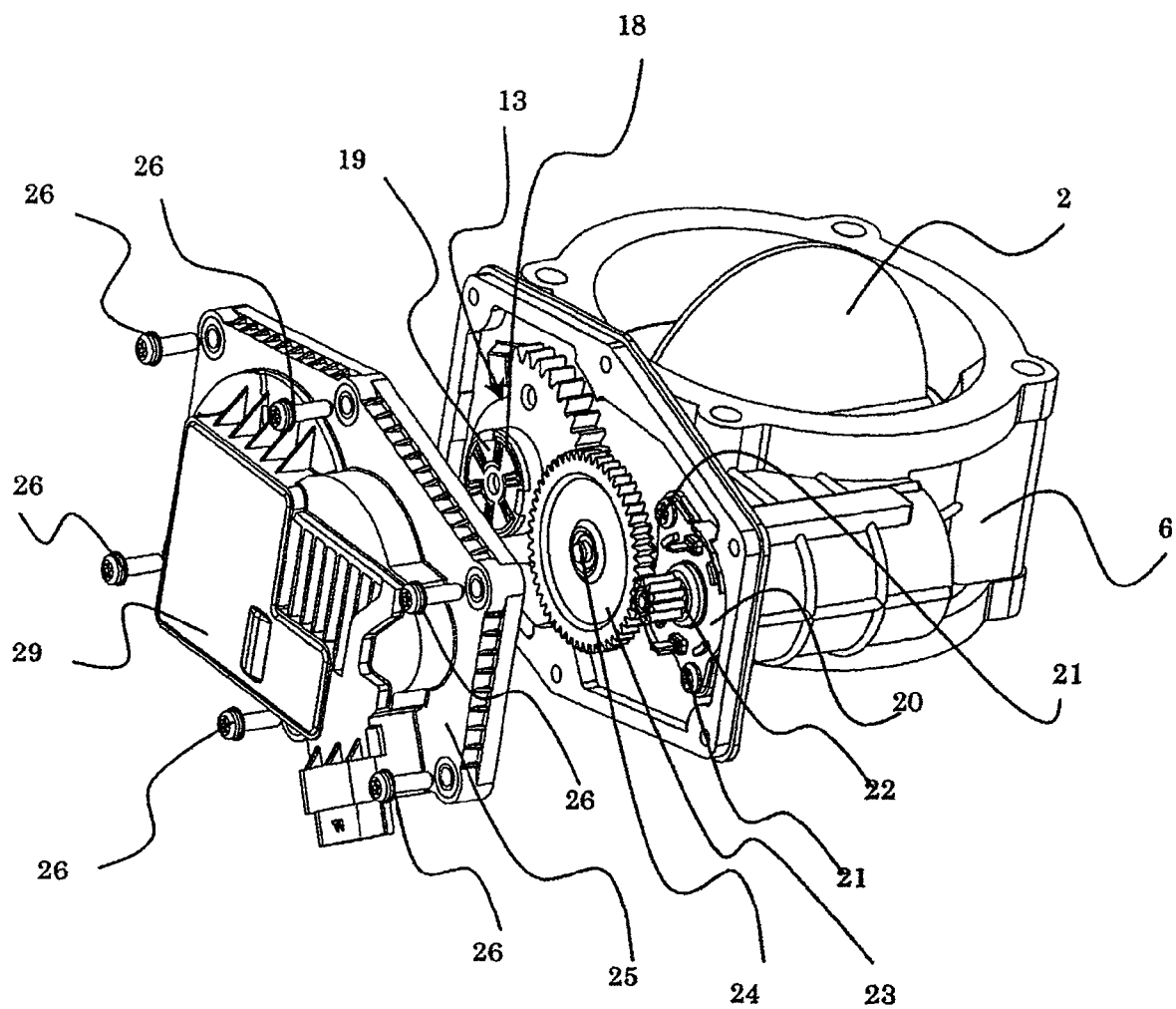
FIG. 7 is a perspective view of a motor-driven airflow control device used for diesel engine vehicles, with a gear cover removed.
Figure 8:
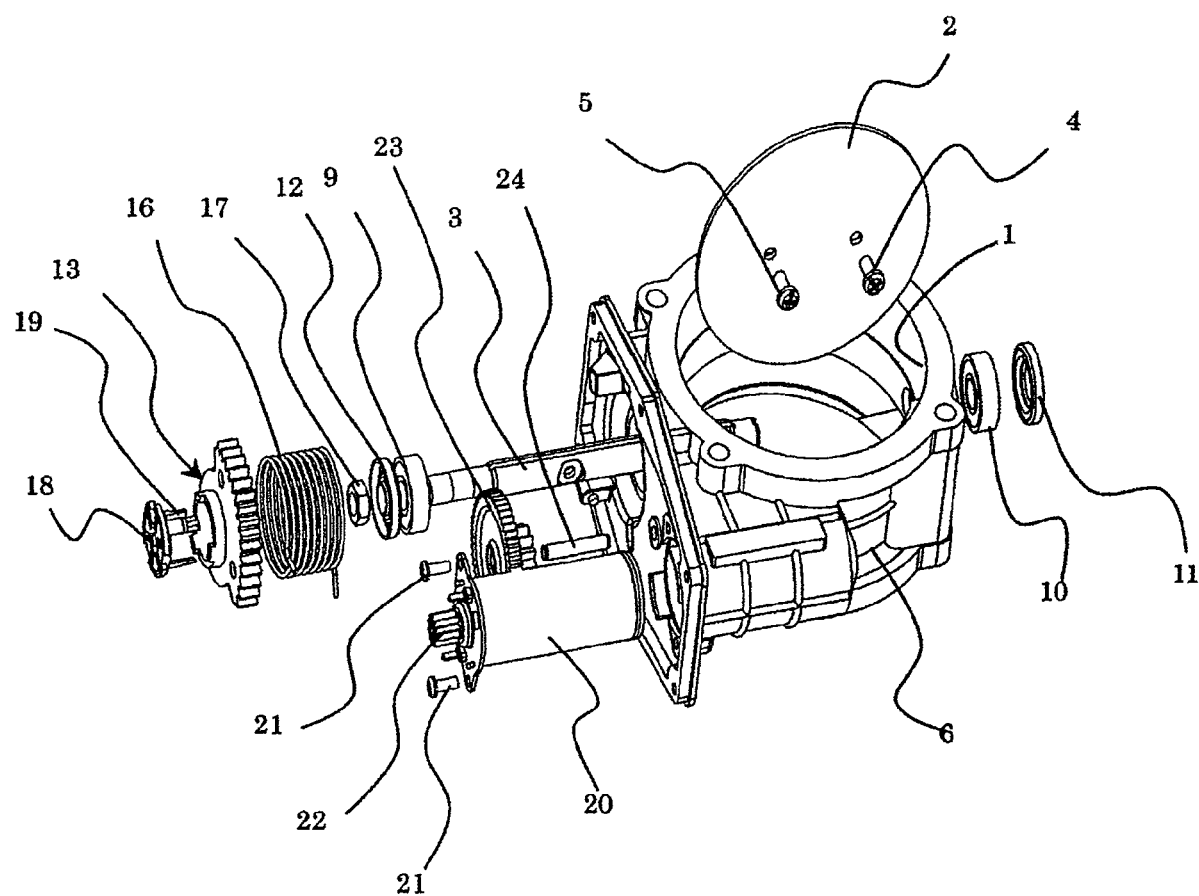
FIG. 8 is a fragmentary perspective view of a throttle body side of a motor-driven airflow control device used for diesel engine vehicles.

In order to solve the above-mentioned subject, the present embodiment arranges the thin resin plate 28 on the gear cover 25, as shown in FIGS. 4 and 5, to shield the substrate mounting space 31 from the gear housing 30.

By mounting the stationary substrate 27 on the resin plate and then covering the substrate mounting space 31 with a resin cover 29, it becomes possible to arrange the stationary substrate 27 in the substrate mounting space 31 which is shielded from the gear housing 30 and ambient air, thus overcoming the above-mentioned subject.

Further, by shielding the substrate mounting space 31 from the gear housing 30 by means of the thin resin plate 28, it becomes possible to eliminate the need to increase the clearance between the conductor plate 18 and the stationary substrate 27 to an unnecessarily large level, the clearance affecting the accuracy of the non-contact rotation angle sensor. Accordingly, it also becomes possible to alleviate tolerances of parts relevant to thrust dimensions and accordingly provide a compact and low-price electronic throttle body.

Here, the return spring 16 pushes the conductor plate 18 almost to the thin resin plate 28 to retain the conductor plate 18 so as not to be axially shaken to an unnecessarily large extent. This makes it possible to maintain a small clearance between the conductor plate 18 and the stationary substrate 27 on a long-term basis, and accordingly maintain the accuracy of the non-contact rotation angle sensor.

The best mode of junction structure between the thin resin plate 28 and the stationary substrate 27 by adhesive agent is the same as that explained in FIGS. 1 to 3.

Figure 9:
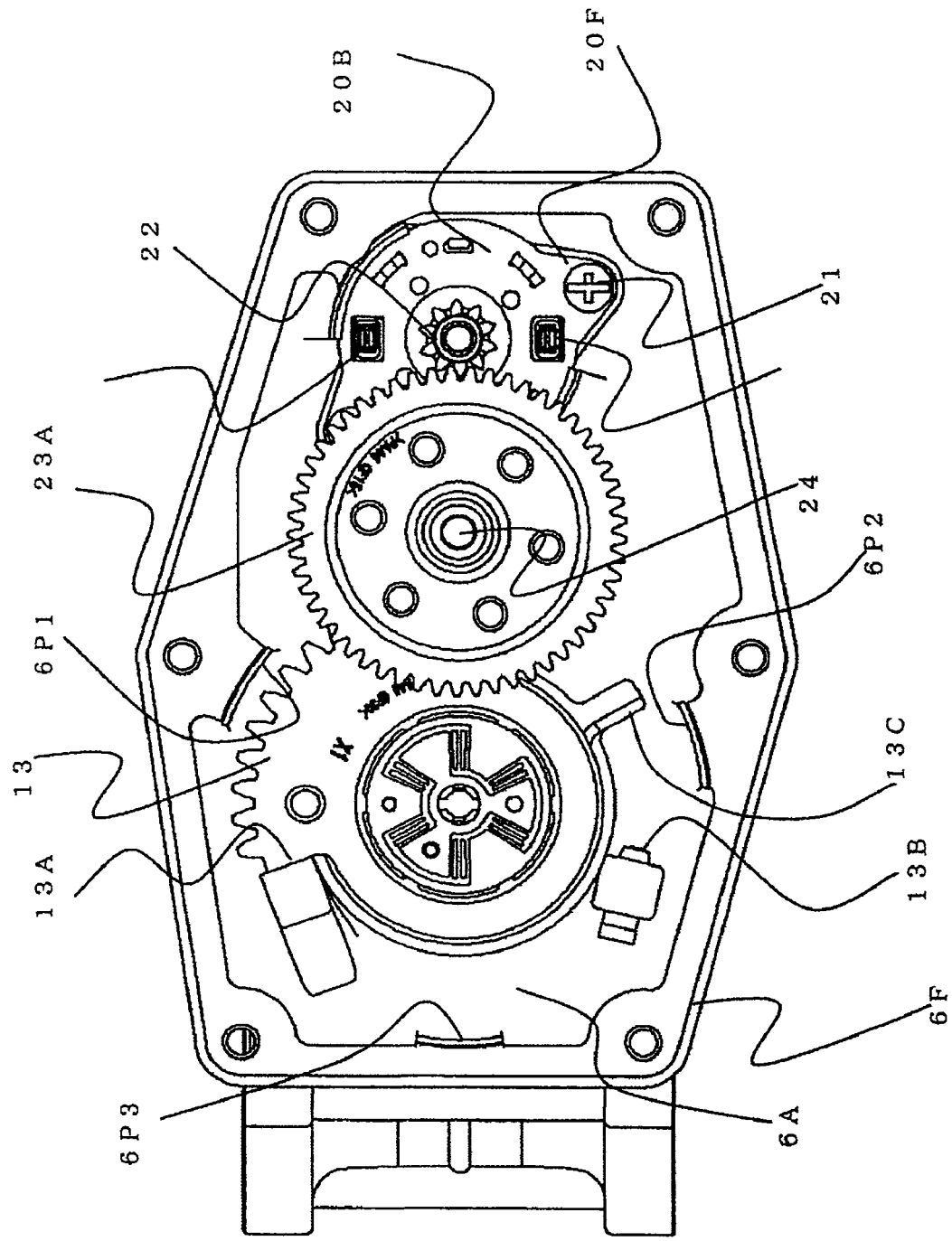
FIG. 9 is a plan view of a gear housing of a motor-driven airflow control device used for diesel engine vehicles.

FIG. 9 shows the plan view of the gear housing 30. The gear housing 30 is defined by a frame 6F to which the gear cover 29 is fixed. Six screw holes for bolting the gear cover 29 are seen inside the frame 6F. 6P1 to 6P3 denote walls for positioning the gear cover 29. When positioning projections of the gear cover 29 are stopped by the three walls, the conductors of the stationary substrate 27 are positioned with the conductor of the rotary member, allowing output of a signal within a required allowable range. A fully open stopper 13A mechanically determines the initial position, i.e., fully open position of the throttle gear 13, the stopper being composed of a projection integrally formed with the side wall of the throttle body.

When the cutout end of the throttle gear 13 comes into contact with this projection, the throttle shaft 3 cannot rotate beyond the fully open position.

A fully closed stopper 13B restricts the fully closed position of the throttle shaft 3, i.e., the end 13C on the opposite side of the throttle gear 13 comes into collision with the fully closed stopper 13B at the fully closed position, preventing the throttle shaft 3 from rotating exceeding the fully closed position. Thus, a maximum value of the rotational position of the stationary conductor (exciting conductor plate 18) fixed to the end of the throttle shaft 3 is determined.

Outputs of the signal-detecting conductors (corresponding to the conductor shown by reference numeral 3C of FIG. 2) at these stopper positions denote fully closed and fully open values. Reference numeral 20B denotes the motor bracket, and 20F a flange of the motor bracket 20B.

Second Embodiment

Figure 10:
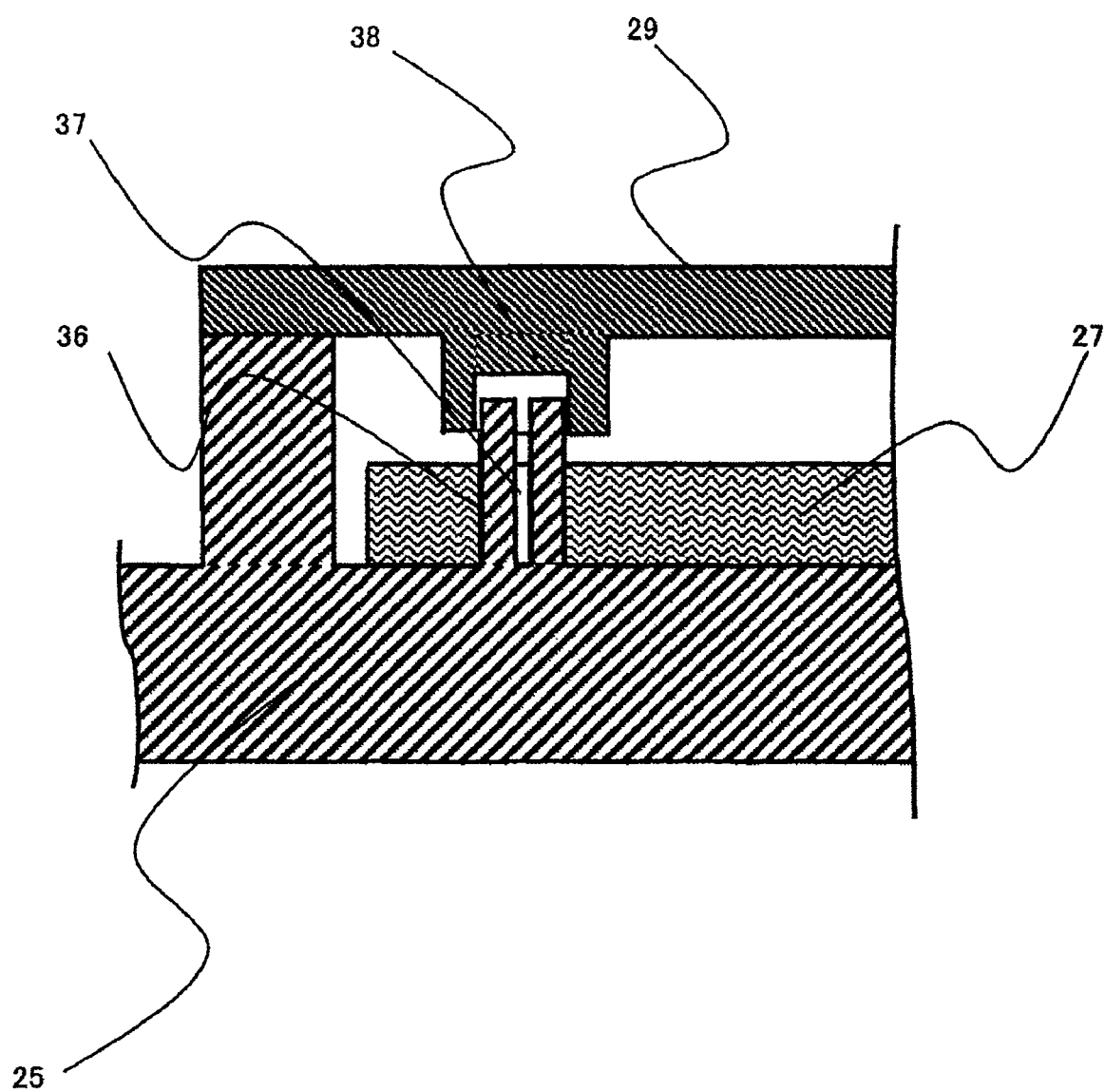
FIG. 10 is a sectional view for explaining a part of the configuration of a stationary substrate mounting space according to a second embodiment of the present invention.

An alternative structure with which the stationary substrate 27 is to be fixed will be explained with reference to FIG. 10.

A positioning pin 36 is provided on the gear cover 25.

A slot 37 is provided on the positioning pin 36 whose diameter is larger than that of an attachment hole made on the stationary substrate 27.

The use of this structure allows the spring force of resin by the positioning pin 36 to be exerted on the attachment hole of the stationary substrate 27, making it possible to fix the stationary substrate 27 to the gear cover 25.

On the other hand, a retaining pin 38 is provided on the resin cover 29.

The retaining pin 38 is provided with a hole which is slightly larger than the positioning pin 36, and the positioning pin 36 and the retaining pin 38 are joined together when the resin cover 29 is joined with the gear cover 25.

A fixed clearance is maintained between the above-mentioned retaining pin 38 and the stationary substrates 27. Therefore, if the joining of the stationary substrate 27 by the positioning pin 36 is lost, the position of the stationary substrate 27 is maintained within this clearance, making it possible to prevent the stationary substrate 27 from coming off.

Third Embodiment

Figure 11:
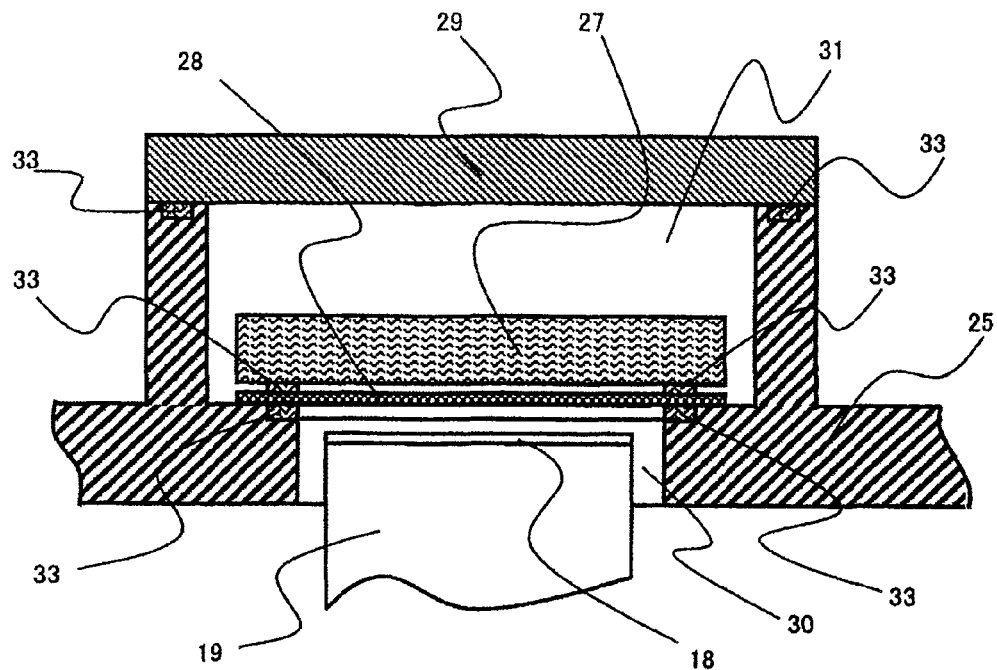
FIG. 11 is a sectional view of a stationary substrate mounting space according to a third embodiment of the present invention.

Immediately after completion of resin molding of the gear cover 25, the gear housing 30 and the substrate mounting space 31 are connected, as shown in FIG. 11.

At this connected portion, the thin resin plate 28 is fixed to the gear cover 25 with adhesive agent 33 to close the window hole. This makes the shielding between the gear housing 30 and the substrate mounting space 31. Then, after similarly fixing the thin resin plate 28 and the stationary substrate 27 with adhesive agent 33 and then making electrical connections between the connector of the gear cover 25 and the stationary substrate 27, the resin cover 29 is fixed to the gear cover 25 with adhesive agent 33 to shield the substrate mounting space 31 from ambient air.

With the above-mentioned embodiment, although a method for bonding the thin resin plate 28 to the gear cover 25 is described, it may be possible that the thin resin plate 28 is first bonded to the stationary substrate 27 first and then the stationary substrate 27 combined with the thin resin plate 28 is bonded to the gear cover 25.

Specifically, although the order of bonding affects assembly workability, it does not affect the shielding of each space.

Fourth Embodiment

Figure 12:
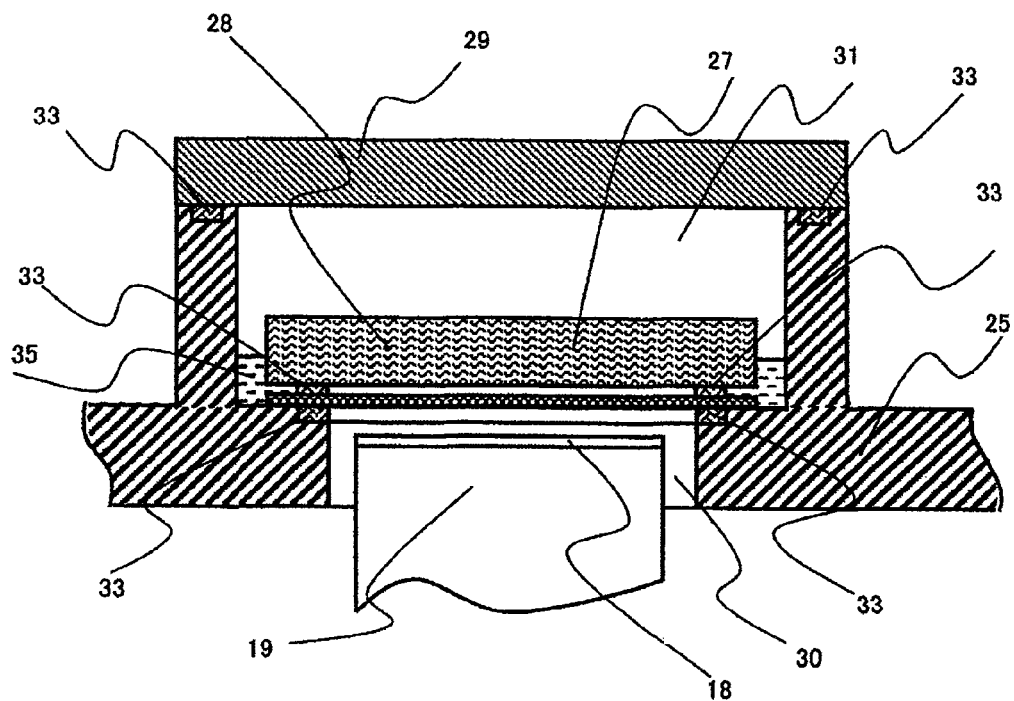
FIG. 12 is a sectional view of a stationary substrate mounting space according to a fourth embodiment of the present invention.

An embodiment of FIG. 12 differs from the one of FIG. 11 in that coating agent 35 having water- and/or chemical-resistance is applied to the surface on the opposite side of the thin resin plate 28 of the stationary substrate 27 to further improve the reliability.

A primary object of the present embodiment is to protect the substrate from condensation in the substrate mounting space 31. The present embodiment is configured so that no problem occurs even if a chemical flows into the substrate mounting space 31.

Fifth Embodiment

Figure 13:
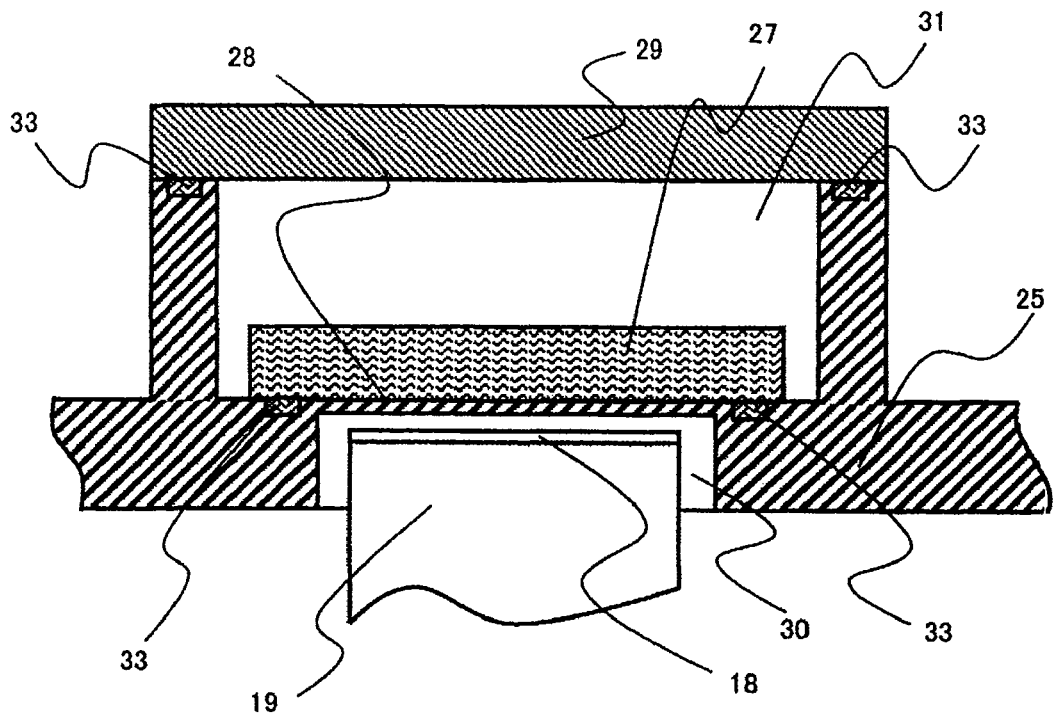
FIG. 13 is a sectional view of a stationary substrate mounting space according to a fifth embodiment of the present invention.

An embodiment of FIG. 13 differs from the one of FIG. 11 in that the thin resin plate 28 is formed by using the material itself of the gear cover 25 when the gear cover 25 is molded.

As shown in FIG. 13, the portion facing the central part of the stationary substrate 27 with conductors formed thereon is made thinner than other portions. This makes the shielding between the gear housing 30 and the substrate mounting space 31 while providing a small clearance.

The present embodiment is advantageous in that the number of parts can be reduced and that a motor-driven airflow control device may be provided at lower cost than the above-mentioned first to fourth embodiments.

Sixth Embodiment

Figure 14:
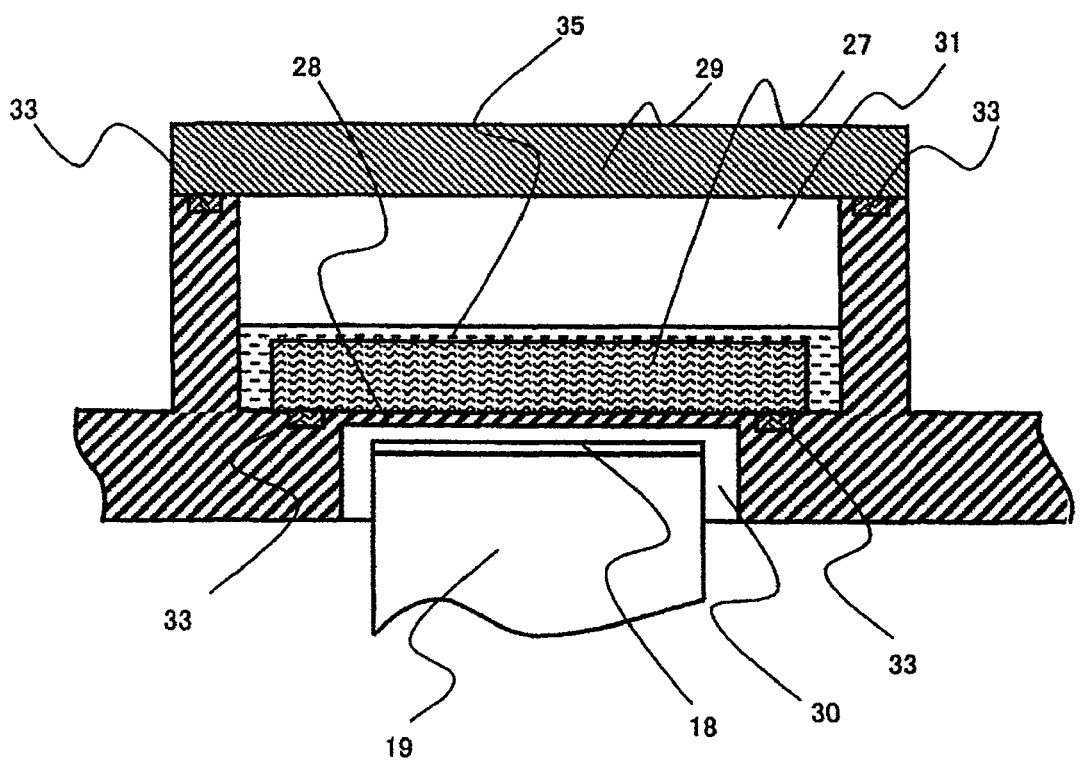
FIG. 14 is a sectional view of a stationary substrate mounting space according to a sixth embodiment of the present invention.

An embodiment of FIG. 14 differs from the one of FIG. 13 in that coating agent 35 is applied to the stationary substrate 27 from the same viewpoint as that in the fourth embodiment.

Seventh Embodiment

Figure 15:
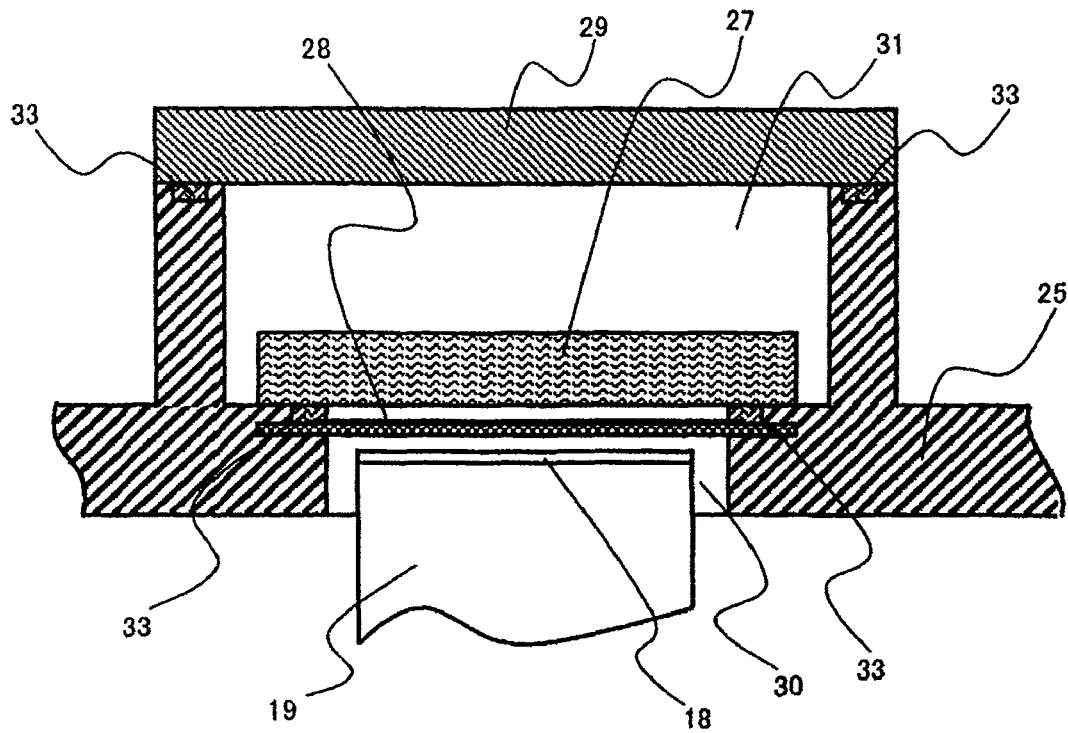
FIG. 15 is a sectional view of a stationary substrate mounting space according to a seventh embodiment of the present invention.

An embodiment of FIG. 15 differs from the one of FIG. 11 in that the thin resin plate 28 is provided as a different member from the gear cover 25 and integrally fix to the window hole when the gear cover is molded.

The present embodiment is more advantageous than the third embodiment in that adhesive agent for fixing the stationary substrate 27 can be reduced, resulting in lower cost than the one of FIG. 11.

Further, with the fourth embodiment shown in FIG. 13, it is necessary to stably mold a portion which is obviously thinner than other portions. This is a very difficult technique from the viewpoint of quality maintenance.

On the other hand, a technique for integrally molding the thin resin plate 28 and the gear cover 25 is more advantageous than the above-mentioned embodiment in that the maintenance of stable quality becomes easier.

Eighth Embodiment

Figure 16:
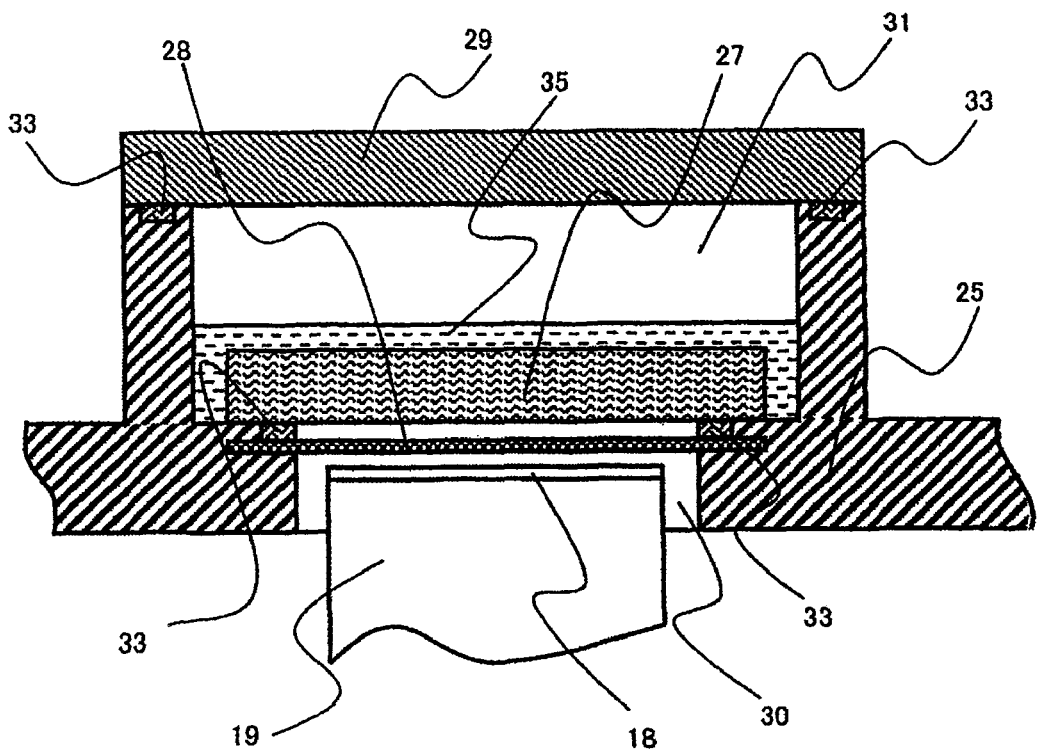
FIG. 16 is a sectional view of a stationary substrate mounting space according to an eighth embodiment of the present invention.

An embodiment of FIG. 16 differs from the one of FIG. 15 in that coating agent 35 is applied to the stationary substrate 27 from the same viewpoint as that in the second embodiment.

Ninth Embodiment

The structures of the above-mentioned embodiments are such that the gear housing 30 is formed with the gear cover 25, the seal member 32, and the throttle body 6; the substrate mounting space 31 is defined with the gear cover 25 and the resin cover 29; and the thin resin plate 28 is bonded to each space boundary, i.e., the stationary substrate 27 is incorporated from outside of the gear cover 25. The following describes embodiments of a structural body for which the stationary substrate 27 is incorporated from inside of the gear cover 25 will be explained below with reference to FIGS. 17 to 20.

Figure 17:
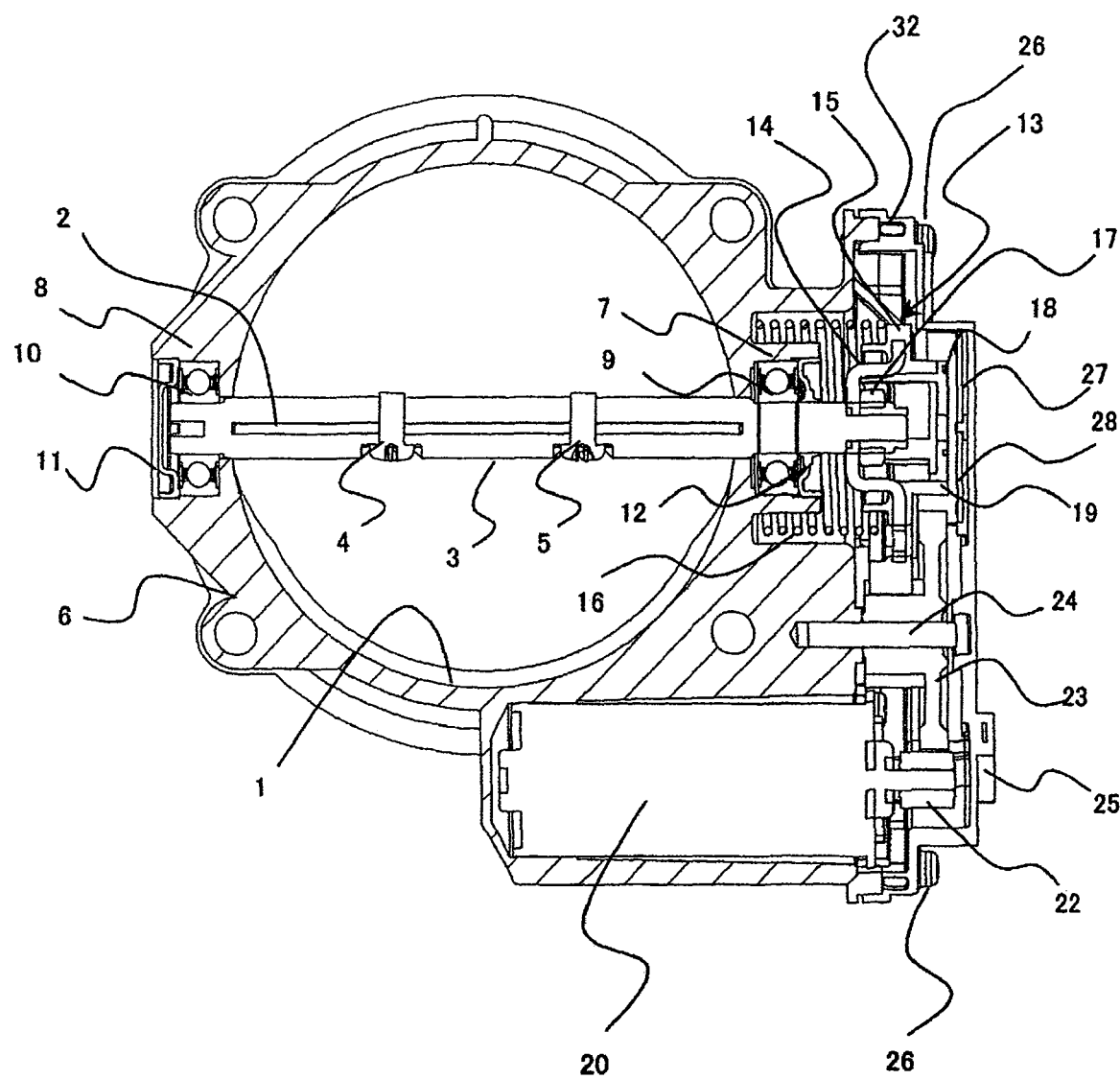
FIG. 17 is a sectional view of a motor-driven airflow control device that mounts a stationary substrate inside a gear cover.

A ninth embodiment shown in FIG. 17 differs from the ones of up to FIG. 16 in that the resin cover 29 is absent.

The resin cover 29 is not used in FIG. 17 and accordingly the number of parts is reduced and the process of adhesive agent, etc. for attaching the resin cover 29 to the gear cover 25 is no longer required. Therefore, the present embodiment is more advantageous than the embodiments of up to FIG. 16 in that the cost can be reduced.

Figure 18:
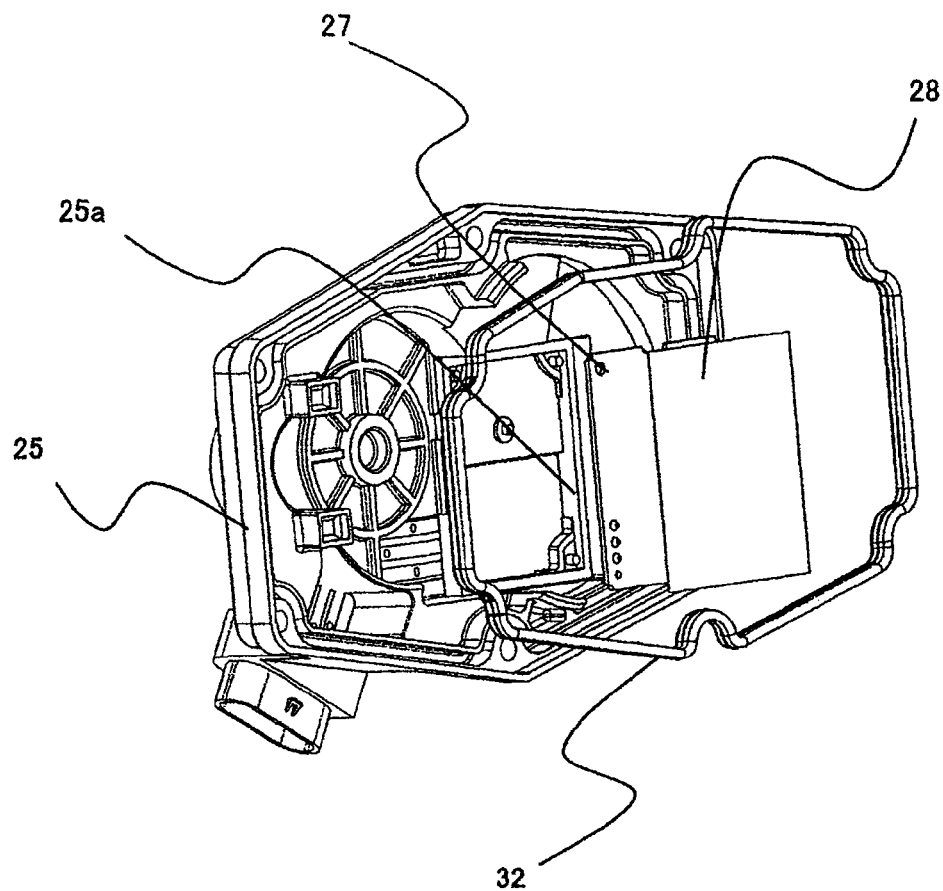
FIG. 18 is a fragmentary perspective view of a gear cover of a motor-driven airflow control device that mounts a stationary substrate inside a gear cover.

FIG. 18 shows a fragmentary perspective view.

The gear cover 25 is provided with such a wall 25a that extends around the four sides of the stationary substrate 27.

After attaching the stationary substrate 27 to a rectangular portion surrounded by the wall 25a and then completing electrical connections between the connector of the gear cover 25 and the stationary substrate 27, the thin resin plate 28 is bonded with the wall 25a of the gear cover 25 to provide the shielding between the gear housing 30 and the substrate mounting space 31.

Figure 19:
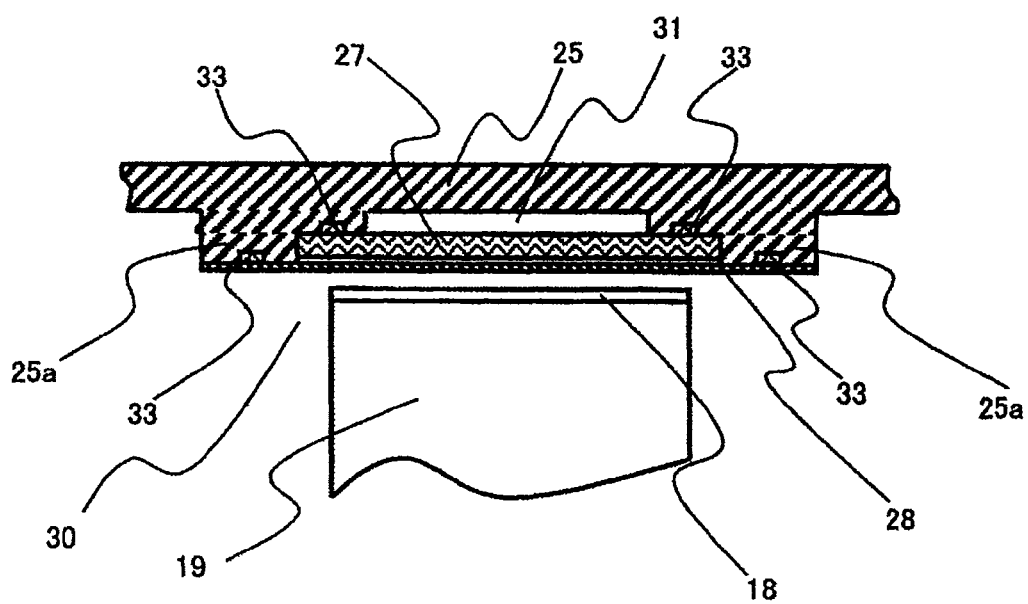
FIG. 19 is a sectional view of a stationary substrate mounting space according to a ninth embodiment of the present invention.

FIG. 19 is a fragmentary sectional view showing a structure of the sealed portion.

Similarly to the first to eighth embodiments, the substrate mounting space 31 is shielded from the gear housing 30 and ambient air, making it possible to protect the stationary substrate 27 from abrasion powder of gears and chemicals such as $SO_2$.

Tenth Embodiment

Figure 20:
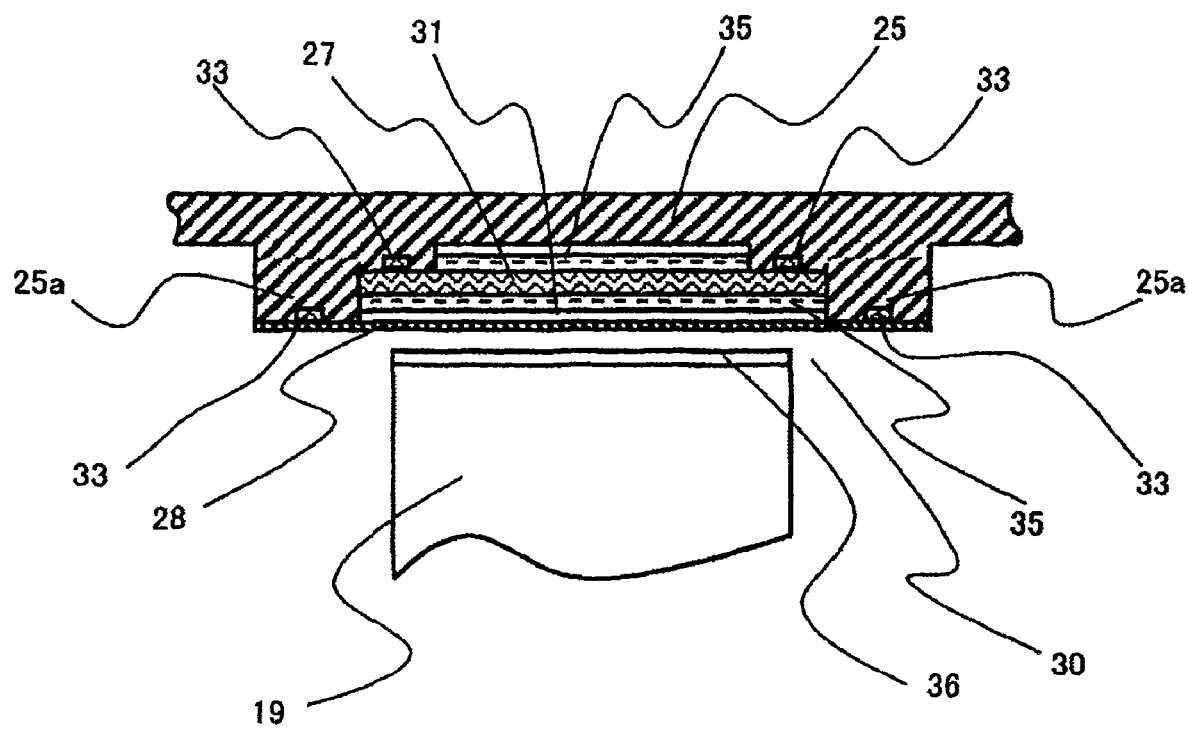
FIG. 20 is a sectional view of a stationary substrate mounting space according to a tenth embodiment of the present invention.

An embodiment of FIG. 20 differs from the one of FIG. 19 in that coating agent 35 is applied to the stationary substrate 27 from the same viewpoint as that in the third embodiment.

Aspects of these embodiments will be explained below.

1. An electronic motor-driven airflow control device is configured so that: a movable member of a non-contact position detecting element for detecting the position of a throttle valve is fixed to a throttle shaft; a stationary member with electronic components mounted thereon is arranged on a gear cover; the stationary member of the position detecting element is arranged in a space shielded from a space where drive system parts for moving the throttle valve are arranged; the portion of the gear cover on which the stationary member of the position detecting element is mounted is made thinner than other portions; and the movable member of the above-mentioned position detecting element is arranged in proximity to the above-mentioned thin portion.

2. The motor-driven airflow control device according to the first embodiment is configured so that: the above-mentioned thin portion of the gear cover is integrally molded with the gear cover made of a material different from the gear cover to shield the stationary member from a space where the drive system parts are arranged.

3. The motor-driven airflow control device according to the first embodiment is configured so that: the above-mentioned thin portion of the gear cover is formed with a film member; the film member is arranged between the gear cover and the stationary member of the position detecting element to shield the stationary member from a space where the drive system parts are arranged.

4. The motor-driven airflow control device according to the third embodiment is configured so that a film made of PI resin is used as the above-mentioned film member.

5. A motor-driven airflow control device having the structure described in the first, second, third, and fourth embodiments is configured so that the surface on the opposite side of the thin portion of the above-mentioned stationary member of the position detecting element is subjected neither to water- nor chemical-resistance coating.

6. A motor-driven airflow control device having the structure described in the first, second, third, and fourth embodiments is configured so that the surface on the opposite side of the thin portion of the above-mentioned stationary member of the position detecting element is subjected to water-resistance and/or chemical-resistance coating.

7. An electronic motor-driven airflow control device is configured so that: a movable member of a non-contact position detecting element for detecting the position of a throttle valve is fixed to a throttle shaft; a stationary member with electronic parts mounted thereon is arranged on a gear cover; the gear cover has a wall surface which covers the four sides of the stationary member of the position detecting element; the stationary member of the position detecting element is mounted in the space; and the stationary member is covered by a film member to shield the space from the space where the drive system parts for moving the throttle valve are arranged.

8. The motor-driven airflow control device according to the seventh embodiment is configured so that a film made of PI resin is used as the film member.

9. A motor-driven airflow control device having the structure according to the seventh and eighth embodiments is configured so that the above-mentioned stationary member of the above-mentioned position detecting element is subjected neither to water- nor chemical-resistance coating.

10. A motor-driven airflow control device having the structure according to the seventh and eighth embodiments is configured so that one side or both sides of the stationary member of the position detecting element is subjected neither to water- nor chemical-resistance coating.

11. A motor-driven airflow control device is configured so that: a movable member of a non-contact position detecting element for detecting the position of a throttle valve is fixed to a throttle shaft; a stationary member with electronic parts mounted thereon is arranged on a gear cover; and coating agent having water- and chemical-resistance is applied to the stationary member of the position detecting element before being mounted on the gear cover.

12. A motor-driven airflow control device having the structure according to the first, second, third, and fourth embodiments is configured so that a stationary member with electronic components mounted thereon is fixed by a pin provided on the gear cover.

13. A motor-driven airflow control device having the structure according to the first, second, third, and fourth embodiments is configured so that a stationary member with electronic components mounted thereon is prevented from coming off by means of a member different from the gear cover.

In accordance with the above embodiments, when a substrate with inductance-based sensor electronic components mounted thereon is mounted on a motor-driven airflow control device, it is possible to improve the durability and corrosion resistance to abrasion powder of metal and resin accompanying sliding gears and bearings, and to chemicals and water that enter an air intake passage.

In particular, signal conductors and annular energizing conductors printed on both sides of the substrate are susceptible to oxidization and corrosion because of complicated shapes and a small width thereof, and a small gap therebetween. In accordance with the present embodiment, however, oxidization and corrosion of these conductors are prevented and output signals thereof are not degraded even after operation for a prolonged period of time.

In accordance with the above-mentioned embodiment, the clearance between the movable and stationary members can be reduced by arranging a thin shield member which is different from the case or gear cover between the movable and stationary members of a non-contact rotation angle sensor or by molding the thin shield member at the same time as the case or gear cover.

As a result, it becomes possible to provide the shielding between a space where drive system parts are arranged and a space where the stationary member is arranged, without increasing the clearance between the movable and stationary members to an unnecessarily large level.

In accordance with the present embodiment, when a substrate with electronic components mounted thereon is mounted not only on an inductance-based position detection apparatus but also on an apparatus used under severe operating conditions such as a motor-driven airflow control device, it becomes possible to provide a space with a very thin member which is different from a space where gears, etc. are arranged, allowing the apparatus to easily be downsized.

Further, by fixing this thin member using adhesive agent, etc., it becomes possible not only to provide a space separated from a space where gears, etc. are arranged but also to ensure the hermetic sealing of the separated space.

Therefore, it is possible to separate a substrate with electronic components mounted thereon from the space where gears, etc. are arranged and attach the substrate in a space with the ensured hermetic sealing. Accordingly, it is possible to provide a motor-driven airflow control device capable of solving such a problem in that the conductors on the substrate are damaged through oxidization and corrosion caused not only by abrasion powder of gears and other mechanical parts but also by chemicals entering through the throttle shaft bearing from the air intake passage of the engine, in particular, $SO_2$, $S_8$, and other corrosive gases and moisture.

Although the above-mentioned throttle body 6 for the present embodiment uses aluminum die-casting, molding with resin material is also possible. Further, although the above-mentioned throttle valve for the present embodiment uses a metal material, molding with resin material is also possible.

With the present embodiment, although the use of a brush-type direct-current motor has been explained, it is also possible to use a brush-less motor, a step motor, a torque motor, an ultrasonic motor, or other actuators using rotational torque.

Further, with the apparatus of the present embodiment, although a configuration based on ball bearings is described, it is also possible to use a needle bearing, a resin plain bearing, etc.

With the present embodiment, although the torque of the direct-current motor is transmitted to the throttle shaft through a two-stage reducer, it may be possible that the torque be transmitted without intermediate gears 23A and 23B, and that the motor and the throttle shaft 3 be coaxially arranged to transmit the torque without gears.

Further, with the present embodiment, although a method for joining the gear cover 25 and the resin cover 29 using adhesive agent has been explained, it is also possible to utilize laser welding, thermal caulking, a seal member such as a rubber, to fix the resin cover 29 to the gear cover 25 because an object of this joined portion is to provide the shielding between ambient air and the substrate mounting space 31.

With the above-mentioned embodiments, although a motor-driven airflow control device for diesel engine vehicles (motor-driven airflow control device) mounting an inductance-based non-contact rotation detection apparatus has been explained, these embodiments can be applied to a component that mounts a substrate having electronic components and has a problem of corrosion or exposure to abrasion powder of metals, not limited to an electronic throttle (motor-driven airflow control device).

Further, although a motor-driven airflow control device (electronic throttle apparatus) for diesel engine vehicles has been explained, these embodiments can also be applied to a motor-driven airflow control device for gasoline engine vehicles.

Further, these embodiments can also be applied to a rotational angle detection sensor, for example, a sensor which detects the rotational angle of accelerator.

Further, these embodiments can also be applied to a rotation angle sensor of actuator for movable blade control of a turbocharger.

These embodiments can also be applied to a rotation angle sensor of gear shift actuator of automatic transmission.

These embodiments can also be applied to a rotation angle sensor of actuator for two-wheel/four-wheel drive changeover.

What is claimed is:

1. A rotation angle sensor, comprising:
   a case member for covering a rotated detection element, and a substrate is attached to said case member;
   energizing conductors for being each annularly arranged on the substrate, and generating a magnetic field by applying a current;
   an exciting conductor for being fixed to the rotated detection element and spaced from and not in contact with said energizing conductors to generate a current according to the rotational position of the rotated detection element through electromagnetic induction; and
   receiving conductors for being each arranged on the substrate to generate a current according to the current flowing in said exciting conductor;
   wherein a shield member made of a resin material is provided between said exciting conductor provided on the rotated detection element and said energizing and receiving conductors that are provided on the substrate to cover said energizing and receiving conductors to shield said energizing and receiving conductors from ambient air.

2. The rotation angle sensor according to claim 1, wherein:
   a window hole is formed on said case member, and the substrate is fixed to said case member with said energizing and receiving conductors positioned so as to face said exciting conductor at said window hole; and
   the shield member made of a resin material is sandwiched between the substrate and said case member.

3. The rotation angle sensor according to claim 2, wherein:
   said case member is provided with a storage wall that surrounds the periphery of said window hole on the surface on the opposite side of said energizing conductor;
   the substrate is stored within the storage wall; and
   the storage wall is further provided with a cover plate for insulating the substrate from ambient air.

4. The rotation angle sensor according to claim 3, wherein:
   connectors are integrally formed on said case member, and terminal conductors are integrally arranged on the connectors through resin molding, one end of each of the connectors being exposed to ambient air and the other end to the storage section; and said energizing and receiving conductors on the substrate are electrically connected to the other end of each of the terminal conductors.

5. The rotation angle sensor according to claim 2, wherein:

a depression is formed at the periphery of said window hole, and said shield member made of a resin material is fixed to said case member by adhesive agent provided in said depression.

6. The rotation angle sensor according to claim 5, wherein:

cutouts are formed at the periphery of said shield member made of a resin material, at which the adhesive agent is attached to the substrate to fix the substrate to said case member.

7. The rotation angle sensor according to claim 6, wherein:

cutouts are formed at adhesive agent at the periphery of said window hole of said shield member made of a resin material, and the substrate covers said cutouts.

8. The rotation angle sensor according to claim 1, wherein:

a window hole is formed on said case member, and the substrate is fixed to said case member with said energizing and receiving conductors positioned so as to face said exciting conductor at said window hole; and the shield member made of a resin material is attached to the surface on the side of said energizing conductors of said case member so as to cover said window hole formed on said case member.

9. The rotation angle sensor according to claim 1, wherein:

the shield member made of a resin material is formed on the substrate as a coating film that covers said energizing and receiving conductors.

10. The rotation angle sensor according to claim 1, wherein:

said receiving conductors are wired on the inner side of said energizing conductors and composed of portions that radially extend and are circumferentially arranged at fixed intervals, inner circumference arc-shaped portions connecting inner circumference ends of the radially extending portions, and outer circumference arc-shaped portions connecting outer circumference ends of the radiating portions; and said exciting conductor includes radiating conductors corresponding to the radially extending portions of said receiving conductors and arc-shaped conductors corresponding to said annular energizing conductors.

11. A motor-driven airflow control device for controlling a throttle valve fixed to a throttle valve shaft by a motor by transmitting the rotation of the motor to the throttle valve shaft through a reduction gear and providing a rotation angle sensor for detecting the rotational position of the throttle valve shaft at the end on the side of the reduction gear of the throttle valve shaft, wherein the rotation angle sensor comprises:

a case member for covering a rotated detection element, and a substrate is attached to said case member;

energizing conductors for being annularly arranged on the substrate, and generating magnetic fields by applying a current;

an exciting conductor for being fixed to a rotated detection element and spaced from and not in contact with said energizing conductors to generate a current according to the rotational position of the rotated detection element through electromagnetic induction; and receiving conductors for being arranged on the substrate to generate currents according to the current flowing in said exciting conductor;

wherein the substrate is attached to a gear cover made of a resin material which covers the reduction gear; and wherein a shield member made of a resin material is provided between said exciting conductor provided on the rotated detection element and said energizing and receiving conductors provided on the substrate to cover said energizing and receiving conductors to shield said energizing and receiving conductors from ambient air.

12. The motor-driven airflow control device according to claim 11, wherein:

a window hole is formed on the gear cover made of a resin material, and the substrate is fixed to the gear cover with said energizing and receiving conductors positioned so as to face said exciting conductor at said window hole; and the shield member made of a resin material is sandwiched between the substrate and the gear cover.

13. The motor-driven airflow control device according to claim 12, wherein:

the gear cover made of a resin material is provided with a storage wall that extends at the periphery of said window hole on the surface on the opposite side of said energizing conductors;

the substrate is stored within the storage wall; and the storage wall is further provided with a cover plate for insulating the substrate from ambient air.

14. The motor-driven airflow control device according to claim 13, wherein:

connectors are integrally formed on the gear cover made of a resin material, and terminal conductors are integrally arranged on the connectors through resin molding, one end of each of the connectors being exposed to ambient air and the other end to the storage section; and said energizing and receiving conductors on the substrate are electrically connected to the other end of each of the terminal conductors.

15. The motor-driven airflow control device according to claim 12, wherein:

a depression is formed at the periphery of said window hole, and said shield member made of a resin material is fixed to said case member by adhesive agent provided in said depression.

16. The motor-driven airflow control device according to claim 15, wherein:

cutouts are formed at the periphery of said shield member made of a resin material, at which the adhesive agent is attached to the substrate to fix the substrate to said case member.

17. The motor-driven airflow control device according to claim 16, wherein:

cutouts are formed at adhesive agent at the periphery of said window hole of said shield member made of a resin material, and the substrate covers said cutouts.

18. The motor-driven airflow control device according to claim 11, wherein:

a window hole is formed on the gear cover made of a resin material, and the substrate is fixed to the gear cover made with said energizing and receiving conductors positioned so as to face said exciting conductor at said window hole; and the shield member made of a resin material is attached to the surface on the side of said energizing conductors of the gear cover so as to cover said window hole formed on the gear cover.

19. The motor-driven airflow control device according to claim 11, wherein:
the shield member made of a resin material is formed on the substrate as a coating film that covers said energizing and receiving conductors.

20. The motor-driven airflow control device according to claim 11, wherein:
said receiving conductors are wired on the inner side of said energizing conductor and composed of portions that radially extend and are circumferentially arranged at fixed intervals, inner circumference arc-shaped portions connecting inner circumference ends of the radiating portions, and outer circumference arc-shaped portions connecting outer circumference ends of the radiating portions; and said exciting conductor includes radiating conductors corresponding to the radially extending portions of said receiving conductors and arc-shaped conductors circumferentially arranged along the annular energizing conductors.

\* \* \* \* \*